United States Patent
Kirkegaard

(10) Patent No.: US 7,657,534 B2
(45) Date of Patent: Feb. 2, 2010

(54) ORDER COMMITMENT METHOD AND SYSTEM

(76) Inventor: Jon Kirkegaard, 3988 Cedarbrush, Dallas, TX (US) 75229

(*) Notice: Subject to any disclaimer, the term of this patent is extended or adjusted under 35 U.S.C. 154(b) by 554 days.

(21) Appl. No.: 10/864,456

(22) Filed: Jun. 10, 2004

(65) Prior Publication Data

US 2004/0254842 A1 Dec. 16, 2004

Related U.S. Application Data

(60) Provisional application No. 60/478,448, filed on Jun. 13, 2003.

(51) Int. Cl.
*G06F 17/30* (2006.01)

(52) U.S. Cl. .............. 707/10; 707/3; 707/9; 707/102; 707/205; 705/22; 705/28; 705/7; 705/37; 340/5.92; 235/385

(58) Field of Classification Search .......... 705/22, 705/28, 7, 37; 707/3, 9, 10, 102, 205; 340/5.92; 235/385
See application file for complete search history.

(56) References Cited

U.S. PATENT DOCUMENTS

| | | | | |
|---|---|---|---|---|
| 5,504,900 A | * | 4/1996 | Raz | 707/10 |
| 5,710,887 A | * | 1/1998 | Chelliah et al. | 705/26 |
| 6,591,243 B1 | * | 7/2003 | Grettve et al. | 705/8 |
| 6,671,673 B1 | * | 12/2003 | Baseman et al. | 705/7 |
| 2002/0049622 A1 | | 4/2002 | Lettich et al. | |
| 2002/1004962 | * | 4/2002 | Lettich et al. | 705/7 |
| 2002/0156684 A1 | * | 10/2002 | Stone et al. | 705/22 |
| 2003/0036929 A1 | * | 2/2003 | Vaughan et al. | 705/5 |
| 2003/0216969 A1 | * | 11/2003 | Bauer et al. | 705/22 |
| 2003/0225637 A1 | * | 12/2003 | Pemberton et al. | 705/28 |
| 2004/0030611 A1 | * | 2/2004 | Byrne | 705/26 |
| 2005/0060235 A2 | * | 3/2005 | Byrne | 705/26 |

FOREIGN PATENT DOCUMENTS

WO    WO02/41197    5/2002

OTHER PUBLICATIONS

Anonymous, "XML Schema Requirements" Feb. 15, 1999, XP-002256948.
Shui, William M., et al., "Application of XML Schema and Active Rules System in Management and Integration of Heterogeneous Biological Data" Mar. 10, 2003, pp. 367-374.

* cited by examiner

*Primary Examiner*—Khanh B Pham
*Assistant Examiner*—Syling Yen
(74) *Attorney, Agent, or Firm*—Andrews Kurth LLP

(57) ABSTRACT

An order commitment method and system are described. The method includes the steps of identifying services and data capable of supporting an order commitment, and mapping the services to enable synchronized on-demand queries. The mapping step includes determining relationships among the services and the data and maintaining the relationships, wherein links are established to create fulfillment information. The method also includes using the fulfillment information to generate the order commitment.

23 Claims, 37 Drawing Sheets

STANDARD ORDER COMMITMENT VIEW

| ITEM ID | 13A-5200-117 |
|---|---|
| START DATE | 2003-03-01 |
| END DATE | 2003-05-31 |
| FACILITY ID | MENLO-IN |
| REPORT GENERATION DATA | null |

| ITEM TYPE | ITEM ID | DESCRIPTION | PLANNED PRODUCTION (C) | COMMITTED ORDERS (A) | FRONT LOG (B) | INVENTORY POSTPONEMENT CENTER (D) | INBOUND INVENTORY (A) | | | | ON HAND AVAILABLE (D-A-B) | COMMIT AVAILABLE (D-A-B+A) |
|---|---|---|---|---|---|---|---|---|---|---|---|---|
| FG | 13A-5200-117 | T/L 5200, ETHERNET+USB BRIDGE, ANNEX A, VCs 0/35, BELL CANADA | 208175 | 7700 | 0 | 5000 | ETA 2003-04-12 6250 | 2003-04-12 6250 | TBD 31000 | | -2700 | 19800 |
| P | 059-E240-A02 | CHASSIS SUB-ASSY, ADSL/ETHERNET, SINGLE PORT W/USB, ANNEX A, BUILD 61-63 | 177900 | 0 | 0 | 40735 | ETA 2003-04-18 40000 | 2003-05-28 17500 | 2003-05-28 17500 | 2003-05-28 17500 | TBD 96520 | 40735 | 150735 |
| P | 018-0028-001 | CABLE ASSY, ETHERNET, YELLOW JACKET, 1800MM | 0 | 0 | 0 | 78200 | ETA TBD 0 | | | | 78200 | 78200 |
| P | 041-0010-002 | PS, WALL PLUG 12V 700-800MA, 2.5MM PLUG, USA | 433494 | 0 | 0 | 64943 | ETA TBD 200000 | | | | 64943 | 64943 |
| P | 773-0023-001 | BOX, SHIP, WHITE W/BLUE LOGO, 10.50 X 7 X 4.25 INCHES, AMBIT | 0 | 0 | 0 | 146141 | ETA TBD 300000 | | | | 146141 | 146141 |

FIG. 3C

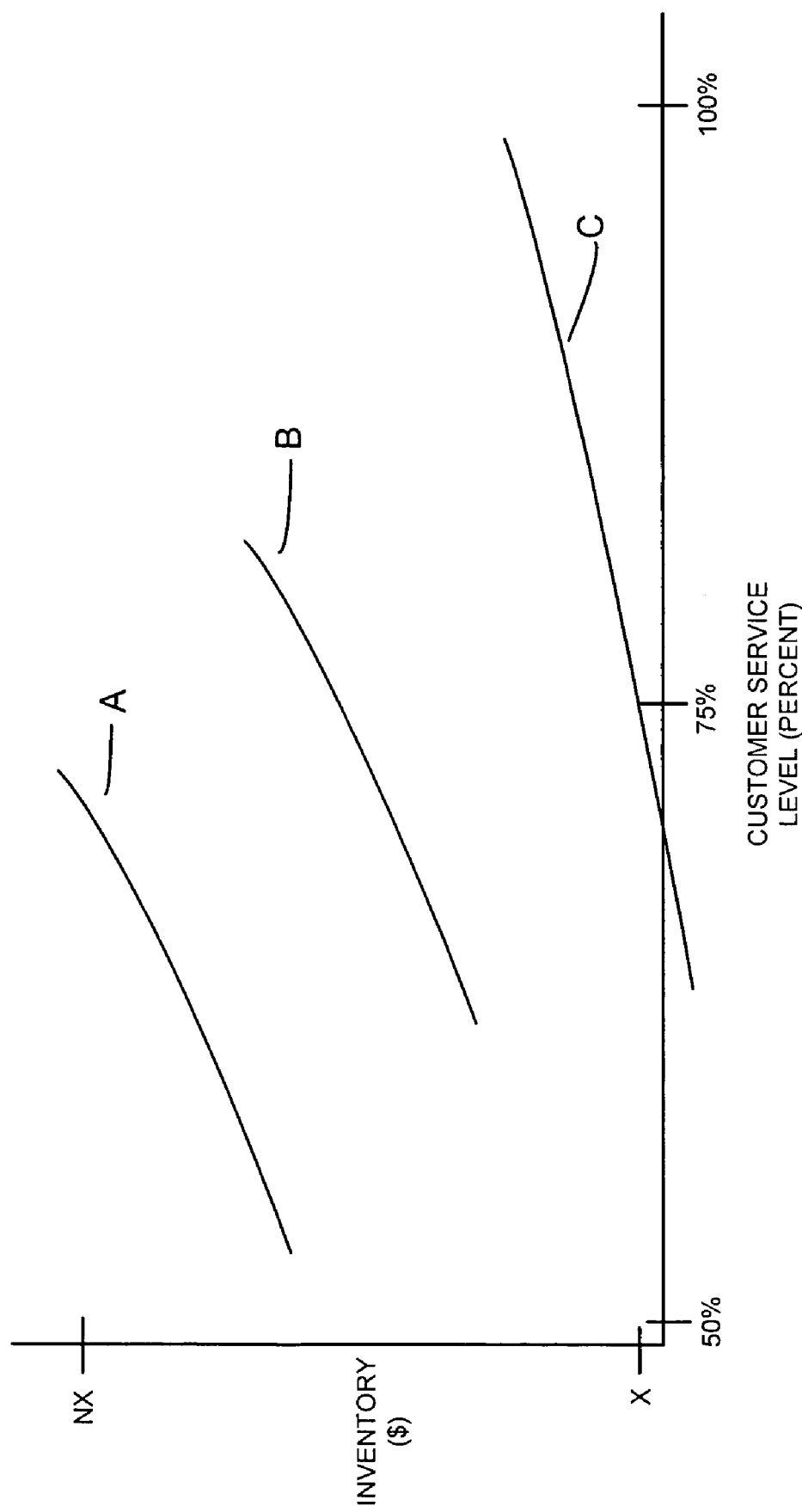

```xml
<?xml version="1.0"?>
<purchaseOrder orderDate="1999-10-20">
    <shipTo country="US">
        <name>Alice Smith</name>
        <street>123 Maple Street</street>
        <city>Mill Valley</city>
        <state>CA</state>
        <zip>90952</zip>
    </shipTo>
    <billTo country="US">
        <name>Robert Smith</name>
        <street>8 Oak Avenue</street>
        <city>Old Town</city>
        <state>PA</state>
        <zip>95819</zip>
    </billTo>
    <comment>Hurry, my lawn is going wild!</comment>
    <items>
        <item partNum="872-AA">
            <productName>Lawnmower</productName>
            <quantity>1</quantity>
            <USPrice>148.95</USPrice>
            <comment>Confirm this is electric</comment>
        </item>
        <item partNum="926-AA">
            <productName>Baby Monitor</productName>
            <quantity>1</quantity>
            <USPrice>39.98</USPrice>
            <shipDate>1999-05-21</shipDate>
        </item>
    </items>
</purchaseOrder>
```

ORDER COMMITMENT METHOD AND SYSTEM

RELATED APPLICATIONS

This application claims the benefit of provisional application Ser. No. 60/478,448, entitled "System and Method for Providing Fee-Based Data Services to Mobile Users" filed on Jun. 13, 2003, the disclosure of which is hereby incorporated by reference.

TECHNICAL FIELD

The technical field is electronic communication of order and commitment of resources throughout a fulfillment network/supply chain.

BACKGROUND

Business management systems including their logistics, manufacturing material planning, and order promising systems that use inventory status and open orders came into being in the 1970s. Such systems may work well in a simple customer-single supplier scenario, or in a vertically-integrated industry, but fail when more complex relationships exist.

SUMMARY

What is disclosed is an order commitment method. The method includes the steps of identifying services and data capable of supporting an order commitment, and mapping the services to enable synchronized on-demand queries. The mapping step includes determining relationships among the services and the data and maintaining the relationships, wherein links are established to create fulfillment information. The method also includes using the fulfillment information to generate the order commitment. Also disclosed is a computer program product comprising a computer-readable medium and computer readable code embodied in the medium, the computer code configured to cause a computer to execute an order commitment method. The method includes relating and managing data from multiple, unrelated data sources to a data schema; forming an query to support an on-demand order commitment based on the related data; storing the data relationships; and creating decision support results based on the stored data relationships.

Further, what is disclosed is a service-oriented method, executed on a computer that includes the steps of registering a plurality of business roles; identifying multiple, concurrent, and unrelated data sources that support implementation of the business roles; and using the identified data sources and the business roles, providing views of information from the data sources, the information relevant to parameters that measure performance of the business roles, wherein the views relate performance of a first parameter relative to a second parameter, and wherein the views are capable of refinement based on the information relevant to the parameters.

Still further, what is disclosed is a method executed on a computer for supplying decision-making information to users in a supply chain network. The method includes providing an unstructured search request into multiple, unrelated data sources, the unstructured search comprising an entry of one characteristic parameter, the one parameter related to goods and services of interest to the user; returning an unstructured search view to the user; providing a refined, structured query into the multiple, unrelated data sources, the structured query comprising an entry of more specific characteristic parameters; returning a structured order commit view; providing a role-based structured query into the multiple, unrelated data sources, the role-based structured query designed to meet a specific role in the supply chain network; and returning a role-based structured order commit view.

Yet further is disclosed a method of providing an enterprise with turn-key information services, where the services executable on a computer. The method includes identifying discrete business roles relevant to the enterprise; relating and managing data from multiple, unrelated data sources to a schema, the data relevant to execution of the business roles; registering and persisting relationships based on the data related to the schema; providing a query function capable of supporting on-demand order commitments based on the related data; and creating decision support results based on the stored data relationships. In an embodiment, the enterprise is a contract manufacturer, and the decision support results provide just-in-time product releases, in-transit product rerouting, and order commitments based on inventory not yet physically available.

DESCRIPTION OF THE DRAWINGS

The detailed description will refer to the following drawings in which like numerals refer to like items, and in which:

FIG. 3C illustrates another version of the order commit of FIG. 3A showing additional details of inbound inventory;

FIG. 4B illustrates the improvement in inventory management possible when using the order commitment network of FIG. 4A;

FIG. 7 illustrates an exemplary purchase order;

FIG. 9C illustrates an unstructured order commit search view result;

FIG. 9G illustrates views available from the SC console;

FIG. 9L illustrates an exemplary view of a mapping to a typical master planning production data source;

DETAILED DESCRIPTION

Figure 1A:
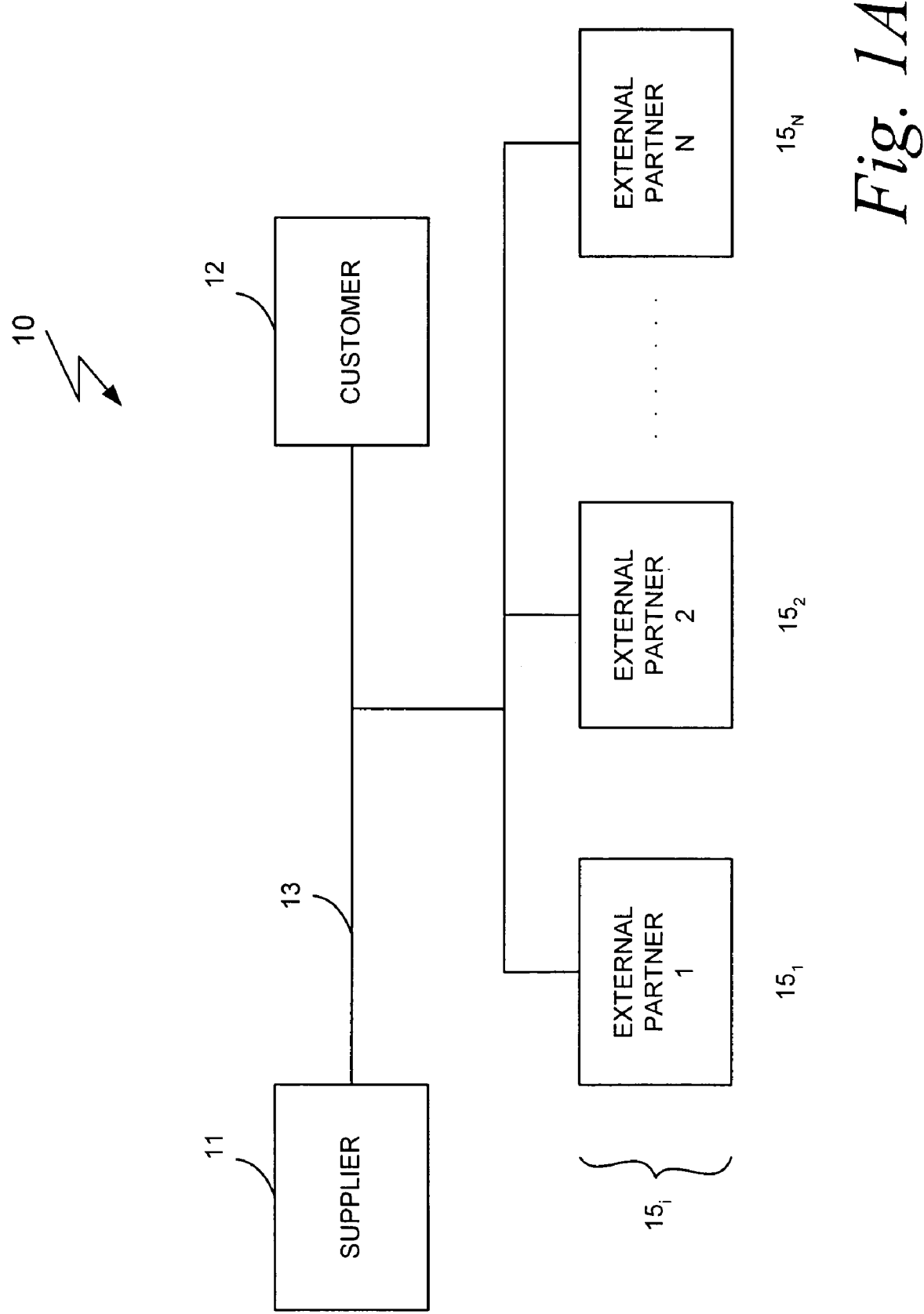
FIG. 1A is a diagram of a generalized goods and services network.

FIG. 1A illustrates a generalized goods and services network 10 in which a supplier 11 provides goods or services (or both) to a customer 12. Also included in the network 10 are external partners $15_i$ (i.e., $15_1$, $15_2$, . . . $15_n$) The external partners $15_i$ may provide the actual goods and services directly to the customer 12, or may supply the goods and services through the supplier 11 as an intermediary.

In the process of identifying desired goods and products, and supplying same to the customer 12, information 13 is exchanged among members of the network 10. Thus, either the customer 12 or the supplier 11 may place an order, and receive, in return, an order commitment. More specifically, the customer 12 may request a service, and the supplier 11 may provide the customer 12 with an order commitment, specifying details related to delivery of the service. The order commitment may span many levels of suppliers and external partners $15_i$, and allows the customer 12 (and others in the network 10) to receive a concurrent, rather than sequential, flow of information from these suppliers and external partners $15_i$.

In formulating the order commitment, the supplier 11 may rely on inputs from one or more of the external partners $15_i$. For example, the supplier 11 may act as a broker for services supplied by the external partners $15_i$. In this scenario, the supplier (broker) 11 receives an order for services from the customer 12. The supplier 11 identifies which of the external partners $15_i$ can provide some or all of the requested services, and receives from the identified partners an order commitment to provide the services. The supplier 11 then provides an order commitment to the customer 12, based on information in the order commitment(s) received from the external partners $15_i$.

Many other scenarios related to the provision of goods and services are possible with the network 10. However, in each such scenario, one factor in providing precise, accurate and timely order commitments is the exchange of information among members of the network 10. The information exchange may be facilitated by agreements or mechanisms established among the supplier 11 and the external partners $15_i$ that allow each to access data required to complete, and where necessary revise, the order commitment. More specifically, and for example, the supplier 11 may access, on-demand and in real-time, certain data of one or more of the external partners $15_i$ so that the supplier 11 may provide the customer 12 with a precise, accurate and timely order commitment. To provide on-demand, real-time information access, the supplier 11 may map information from the external partners $15_i$ to an Xschema used during generation of the order commitment. Further, the supplier 11 may establish links with the external partners $15_i$ to acquired the needed information. The links and the mapping establish persistent relationships between an external partner's information the supplier's schema.

Figure 1B:
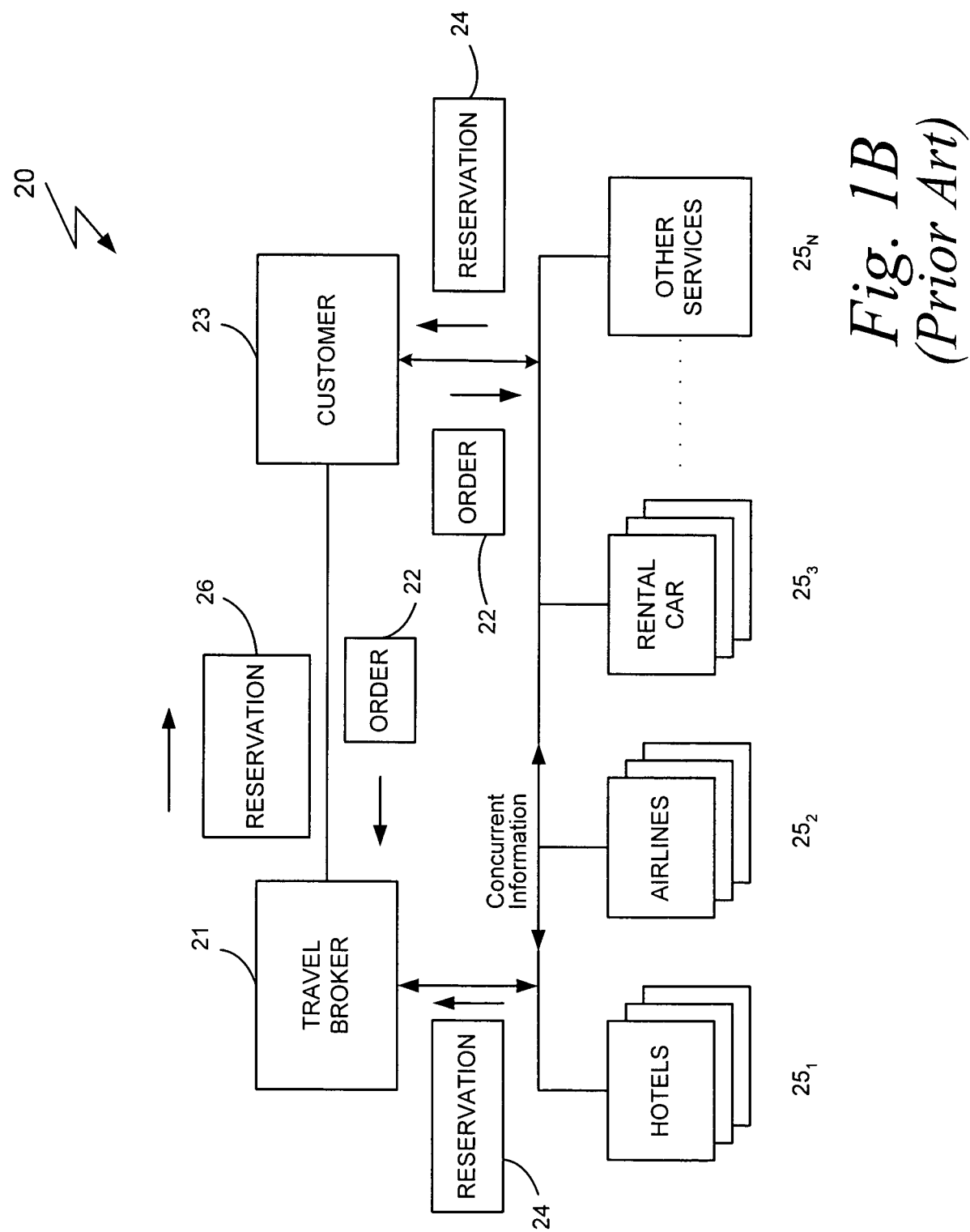
FIG. 1B is a prior art request and reservation system for travel-related planning.

FIG. 1B illustrates a prior art use of requests and corresponding commitments in the context of a travel planning and reservation system 20. The travel planning and reservation system 20 includes travel broker 21, customer 23, and services $25_i$. An inventory of the services $25_i$ includes hotels $25_1$, airlines $25_2$, rental car $25_3$, and other services $25_N$. The services $25_i$ share information among themselves and with the travel broker 21. The customer 23 places an order 22 for services with the travel broker 21, and receives in return a reservation 26. The travel broker 21 can forward the order 22 to the services $25_i$ and receive in return a reservation 24. In addition, the customer 23 can contact any of the services $25_i$ directly to place the order 22 and to receive the reservation 24 in return. Thus, the system 20 provides for concurrent information flows among the services $25_i$, the travel broker 21, and the customer 23.

One or more of the services $25_i$ may have an arrangement with the travel broker 21 whereby the travel broker 21 is allocated a portion of a service to commit. For example, a hotel chain $25_1$ may allocate 10 percent of its rooms for reservation by the travel broker. One or more of the services $25_i$ may also operate a brokerage for other services. For example, an airline $25_2$ may operate a hotel brokerage under a cooperative agreement with one or more of the hotels $25_1$. The airline $25_2$ could then commit hotel rooms for occupation by the customer 23. That is, the hotel $25_1$ allocates a block of rooms to the airline $25_2$. To manage its hotel bookings, the airline $25_2$ maintains a hotel room database and reservation system, which may be updated periodically (i.e., a batch update) based on information from the hotel.

In a typical scenario involving the system 20, a hotel $25_1$ sells all of its rooms for a period directly to customers, such as the customer 23, or to customers through the travel broker 21, leaving no vacancy at the hotel and effectively de-allocating the airline's block of hotel rooms. Then the airline $25_2$, operating its hotel brokerage service, receives a request for a hotel room. However, the airline's database has not been updated to reflect the de-allocation of its block of hotel rooms. As a result, the airline $25_2$ reserves a hotel room for a customer when in fact, no room is available. The result is that a customer attempting to check into the hotel is denied a room, customer service level is degraded, and the hotel pays to place the customer at another hotel.

Figure 1C:
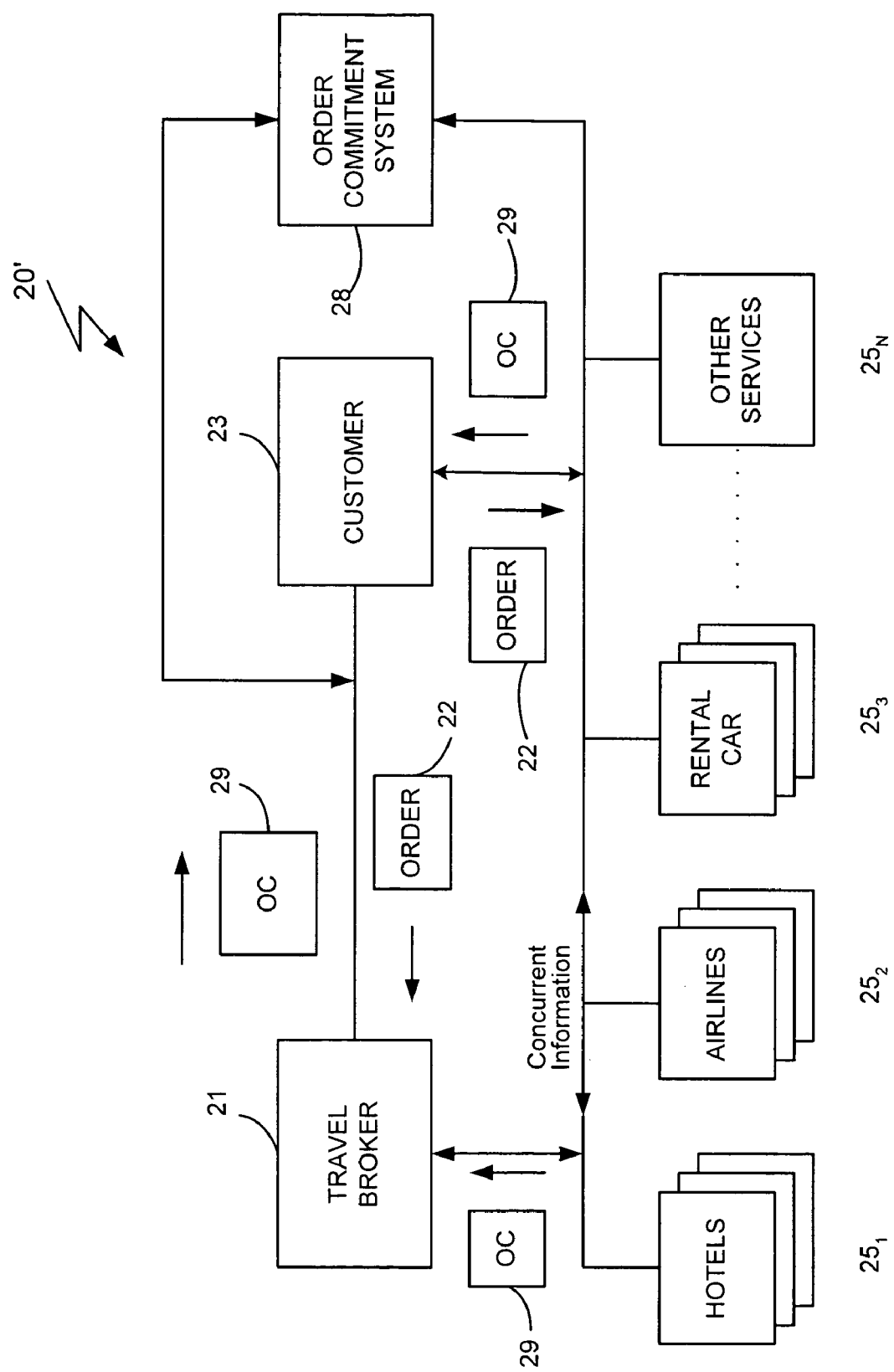
FIG. 1C is a diagram of the goods and services network of FIG. 1A adapted to provide travel-related goods and services.

As a distinct improvement over the system 20 shown in FIG. 1B, a travel planning and reservations network 20' shown in FIG. 1C implements the herein described order commitment methods and systems. The network 20' includes the customer 23, the travel broker 21, and the services $25_i$. However, the network 20' also includes an order commitment system 28, which may be implemented at one or more nodes in the network 20'. That is, the order commit system 28 may be implemented at the travel broker 20' and may be replicated in whole or in part at one or more of the services $25_i$. Using the order commitment system 28, the concurrent information flows among the broker 21, the customer 23, and the services $25_i$ are available for viewing on-demand, and in real time so that each member of the network 20' has almost instantaneous access to all the data needed to generate a precise and accurate order commitment 29. More specifically, data from each of the services $25_i$ is mapped to a schema (not shown) of the order commitment system 28. The mappings establish relationships that are persisted in the network 20' without having to create separate, aggregated databases. When any member of the network 20' places an order 22 or other service request, or otherwise attempts to view data in the network 20', the order commit system 28 executes a query of the data maintained by the network members, using the mappings of established relationships. Thus, for example, the travel broker 21 is able to see an up-to-date inventory of available hotel rooms. Similarly, the airline 25₂ operating the hotel brokerage will also be able to view in real-time, the status of available hotel rooms. This same functionality can be pushed down to the customer. More specifically, the customer 23 can maintain a local repository (not shown) with a local version of the order commit system schema and queries so that the customer 23 can also access hotel room inventory on a real-time basis. Thus, not only are more efficient use of individual assets or capacities achieved but also combinations of service preferences (e.g., a rental car, airline, and hotel preferences) can be enforced thereby creating cooperative and concurrent insight to customer desires and needs. The network 20' is thereby capable of providing full (i.e., near 100 percent, but not exceeding 100 percent) utilization of available reservation (e.g., hotel rooms) while not promising a reservation that is already booked.

Returning to FIG. 1A, the network 10 may be adapted to many other scenarios in which disparate parties are used to supply goods and services to a customer. One such scenario involves the concept of supply chain management. In this scenario, intermediate suppliers (i.e., external partners) provide goods and services, and related information, to an end-supplier that ultimately provides the goods or services to the customer. The description that follows explains use of order commitment in a supply chain scenario. In addition, in the description that follows, and in the appended claims, the following terms should be accorded the accompanying definitions, and their equivalents:

Order Fulfillment: The process of managing the logical information flow and physical distribution of providing goods (inventory) from sellers to buyers in a supply chain network. Order fulfillment includes the ability to promise quantity and deliver date to the customer and meet those promises. In essence, customers often are willing to be promised a certain lead-time for receipt of goods and services provided the commitment holds firm.

Working Capital: The inventory of physical saleable goods and components; the cash on the balance sheet to support the timing differences between accounts payable and accounts receivable, and increasing in the world of outsourced business models the contractual commitments to build or buy material to meet customer orders.

Schema: A data and process relationship model that supports a real-time synchronization of the order fulfillment services and supporting data including the planned production and planned production material and resources.

Supply Chain Management: A broad industry term. For the herein claimed invention, the definition of supply chain management is provided by the Council of Logistics Management is used:

Supply Chain Management encompasses the planning and management of all activities involved in sourcing and procurement, conversion, and all Logistics Management activities. Importantly, it also includes coordination and collaboration with channel partners, which can be suppliers, intermediaries, third-party service providers, and customers. In essence, Supply Chain Management integrates supply and demand management within and across companies.

RFID EPC Codes: The Electronic Product Council has and is in the process of defining standards for RFID tag data standards much the way the Uniform Commercial Code has provided for bar codes. Order Commit is premapped to the RFID EPC codes and allows for the EPC code to be related to any extended enterprise data in real-time Sales and Operations Planning: A process developed over the past four decades that encourages an enterprise to have frequent and consistent communication between leading frontline sales resources and operational supply resources. The more frequent demand and supply are truly netted (not guessed or manually overridden) the more efficient a financial enterprise becomes in committing then meeting orders.

Xquery: Xquery is an emerging standard for defining relationships of structured and usntructed data using Xpath XML definition language.

Accuracy: refers to the amount of error attendant with data used by the order commitment process.

Precision: refers to the degree of refinement of the data used in the order commitment process.

W3C: refers to the World Wide Web standards committee for XML and related applications The concept of using manufacturing planning systems (MRP, APS, etc.) along with a combination of current transaction data (e.g. inventory status and open orders) in simple algorithms was pioneered in the 1970's and categorized by APICS as ATP (Available to Promise) or CTP (Capable to Promise). In general, theses simple algorithms proved useful in aligning one plant to its customers and assisted in providing a better commitment to customers. However, these algorithms breakdown in situations involving complex relationships, such as with customers having with multiple facilities, component suppliers, transport partners, and outsourced partners. More specifically, these algorithms breakdown because the algorithms do not represent the concurrent nature of order request and commitment communications. The algorithms also break down because the algorithms do not allow for "fine-tuning" to match the actual nature and types of concurrent information flows available from supply chain partners. Finally, the algorithms breakdown because the algorithms appear to give precise results even when, as is usually the case, the user has no knowledge as to the accuracy of the algorithms' inputs. In fact, the inputs are often inaccurate. The general result of these breakdowns is that supply chain decision makers lose confidence in their supply chain decision support systems, and then revert to manual override of the decision support systems. Common manifestations of this lack of confidence include excessive warehousing of inventory to satisfy a desired customer service level and not fully scheduling use of an asset such as plant capacity or transportation capacity, for example.

Figure 2:
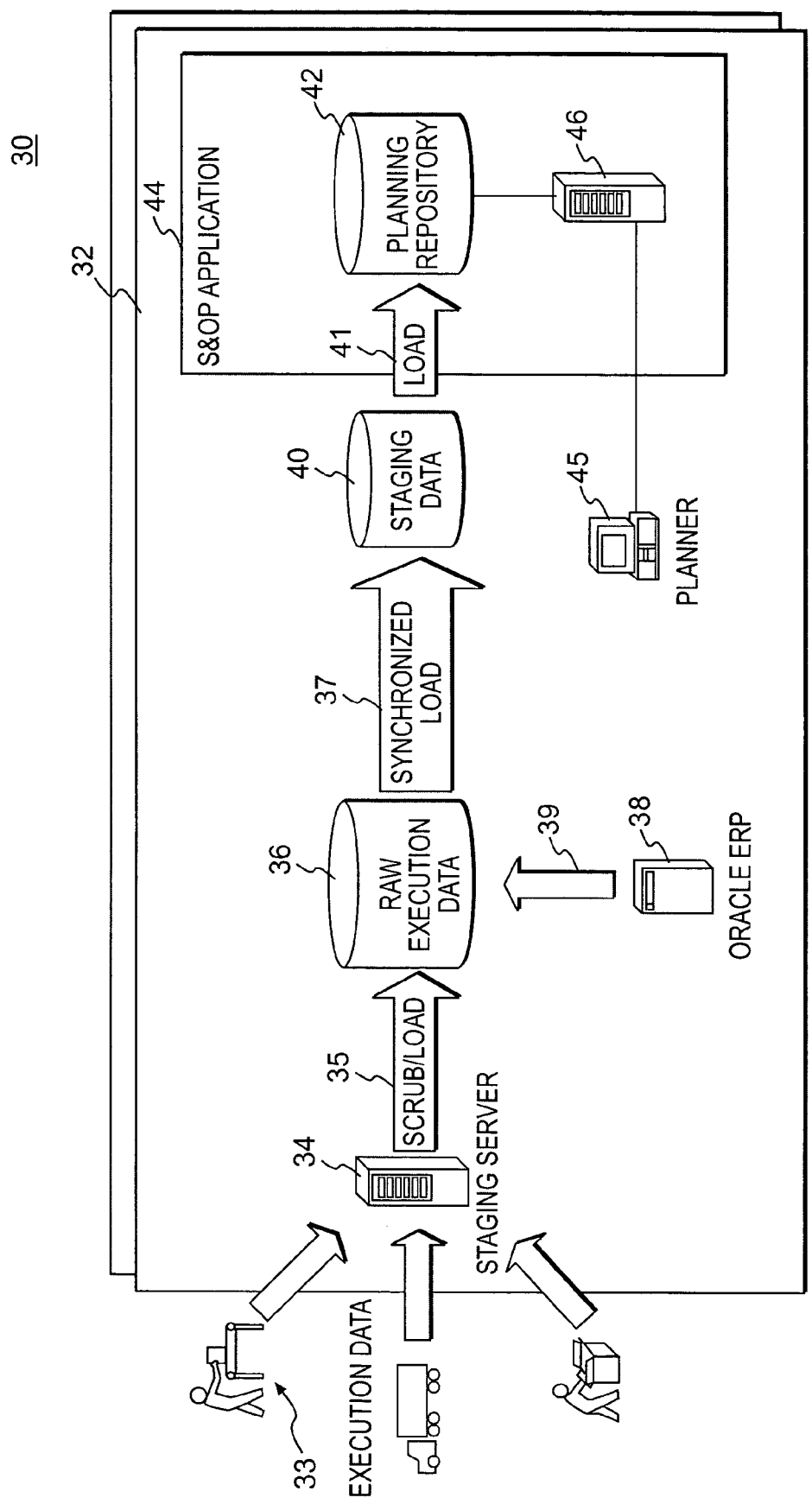
FIG. 2 shows information flows in a prior art system that supports supply chain decision-making.

FIG. 2 shows information flows in a prior art system that supports supply chain decision-making across multiple systems and entities. As shown in FIG. 2, a management system 30 includes a supply chain application 32 that receives execution data 33 from a supplier. The execution data 33 is processed in staging server 34 to produce scrubbed data 35. The scrubbed data 35 is stored in execution data storage 36. The execution data storage 36 receives input 39 from ERP 38. The execution data in the execution data storage 36 is then used to provide a synchronized load 37 into staging data storage 40. A data load 41 is then provided to planning repository 42 within sales and operations planning (S&OP) application 44. The planning repository 42 receives an input from planner 45 by way of staging server 46 and produces output data useable to support supply chain decisions.

One significant drawback to the management system 30 is the need to re-store, or re-persist, data at various stages in the information flow process. For example, the execution data is stored in execution data storage 36, and the same data, after processing, is stored in staging data storage 40. Storing data multiple times is costly and may result in data latency problems. Furthermore, many of the most critically competitive or profitable decisions in any supply chain are decisions that cannot be based on historical batch processing of data from supply chain partners. Instead, these decisions, and corresponding order commitments, are made based on real-time information flows.

To provide improved supply chain decision-making, and more particularly, to provide satisfactory order commitment and order fulfillment, order commitment systems and methods are disclosed. Using an order commitment system, and an accompanying method, a supply chain user can link a bill of lading to a customer's order, purchase order, and inventory balance without costly data warehousing and more importantly without a data warehouse that would be empty due to the cost and effort required to fill the data warehouse. This capability quickly has compounded leverage and value in that concurrent review of multiple sources of data can be scanned and processed. Thus, a shipment from China might use eight different transport carriers, each with an independent tracking system. The tracking systems can be polled concurrently, each tracking system can be related to a purchase order and inventory information and the results can then be aggregated in a formatted view to provide accurate information on the status and estimated time of arrival of said shipment. The capability of representing the Xschema in a SQL schema is also heavily used as clients transition to more real-time and outsourced relationships. Clients can use the Xschema for more traditional sales and operations planning processes and then can transition all or just parts of the data feeds to real-time data and use in a hybrid and cooperative environment.

This order commitment systems and methods allow the user to discover patterns of behavior and a condition of a fulfillment network as the user searches on any parameter. The systems and methods allow the user to enable a variety of structured roles specific to the user's needs and jobs and allows the user to constantly refine the precision of views of data within the supply chain based on agreements and relationship with external supply chain partners and the availability of real-time data.

The order commitment systems and methods allow a manufacturer to provide "universal order promising" across owned and non-owned facilities and information, or the systems and methods allow a logistics provider to provide new services due to easy integration of their shipment tracking to customer's inventory, order, purchase order data regardless of whether the manufacturing is performed at owned facilities, contracted facilities, or suppliers. The order commitment system and method also revolutionize what a supply chain "data warehouse" is and how such a data warehouse is created within a corporation. Rather than collecting data offline and spending time and money pushing the collected data into a logically useable structure, the corporation can define the S&OP and supporting execution data that is required, push external partners to send the appropriate data at the right time using traditional and web services technology, batch what is not available on a real-time basis, and cache the data at a specific interval to act as a supply chain data warehouse backup. An example of such a supply chain data warehouse backup for caching the data is application repository 360 shown in FIG. 5, and described in detail later. As more links in more details are connected, the accuracy and/or the precision of the information available to the supply chain members improve.

The order commitment systems and methods provide users with the ability to link real-time data feeds from many sources into an order commitment Xschema using any type of data in either batch or preferably as real-time, on-demand data. The order commitment systems and methods can be used as part of enterprise awareness and change management consulting of order promising in the supply chain, and can be highly scalable.

Figure 3A:
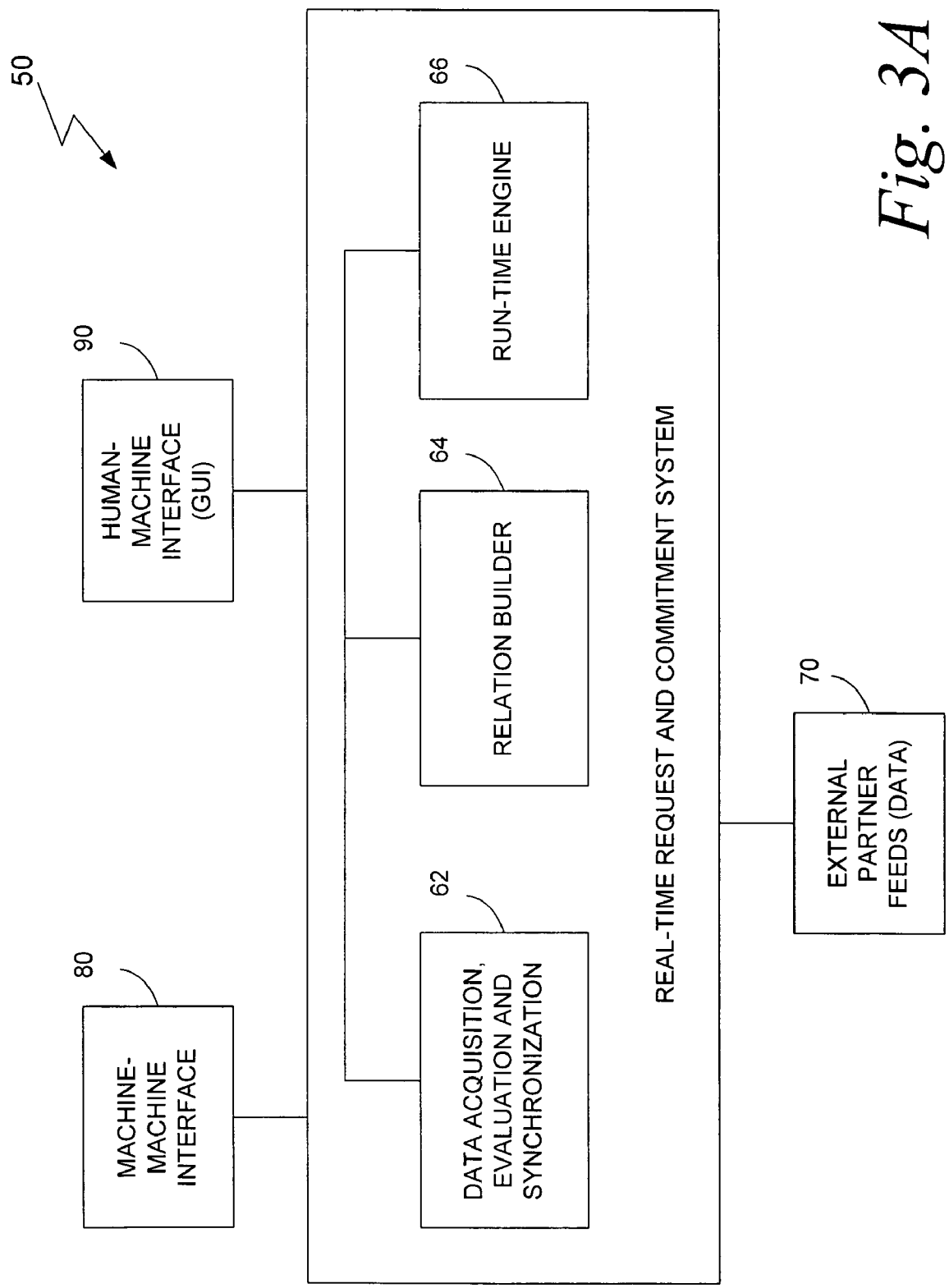
FIG. 3A is a block diagram of an order request and commitment system.

FIG. 3A is a block diagram of an order request and commitment system 50. The system 50 operates as an element of an order commitment network, which will be described later with respect to FIG. 4A. The system 50 includes real-time commitment architecture 60, multiple, unrelated data sources 70, machine interface 80, and human interface (i.e., GUI) 90.

The architecture 60 receives information form the data sources 70, and provides outputs using the interfaces 80 and 90. The interfaces 80 and 90 are capable of displaying role-based views of the data from the data sources 70. An example of a role-based view is a view that would be useful to a warehouse supervisor. (See FIG. 4A, which illustrates the high level users/roles and illustrates the sequential flow of material. At any of the lettered flags in FIG. 4A, the user can best perform its role if the user is presented with as near a real-time concurrent view of information upstream and downstream of their "role" rather than a sequential flow of information along with the material.) The use of role-based views will be described in detail later. The data sources 70 provide information related to goods and services. The information may be used by machines through the machine interface 80 and by humans through the GUI 90. The data sources 70, which may include any number of sources, may each contain both structured and unstructured data. The use of structured and unstructured data, and associated searches for these data, will be described in detail later.

To access the information from the data sources 70 on a real-time, on-demand basis, the architecture 60 may be used to determine a schema related to data from each of the data sources 70, and to map the data to a schema within the architecture 60. To accommodate this mapping, the architecture 60 includes a data acquisition, evaluation, and synchronization module 62. The module 62 uses an established schema, such as an Xschema, for example, to which the data in one or more of the data sources 70 is mapped. Mapping of data from data sources into the Xschema will be described in detail later.

Relation builder 64 determines relations between the established order commitment Xschema of the synchronization module 62 to link discrete data elements from the data sources 70 to corresponding elements in the established Xschema. Alternatively, one or more of the data sources 70 may be pre-certified, so that that data source's data already maps to the established Xschema. Together with the synchronization module 62, the relation builder 64 create maps of the relationships between the data sources 70 and the established Xschema. The maps are then stored (persisted) in the system 50.

Run time engine 66 uses the established maps generated by the relation builder 64 and the synchronization module 62 to execute on-demand and batch queries of the data sources 70. The maps may be saved in the run time engine 66, and in real-time, the run time engine 66 can extract up-to-date information from the data sources 70. The run time engine 66 thus allows for concurrent data from the data sources 70 to be presented in simple to increasingly complex order commitment views that provide simpler, more adaptable and less complicated views that are produced faster, more accurately and than the order promises available with current systems or through manually overriding such systems.

Figure 3B:
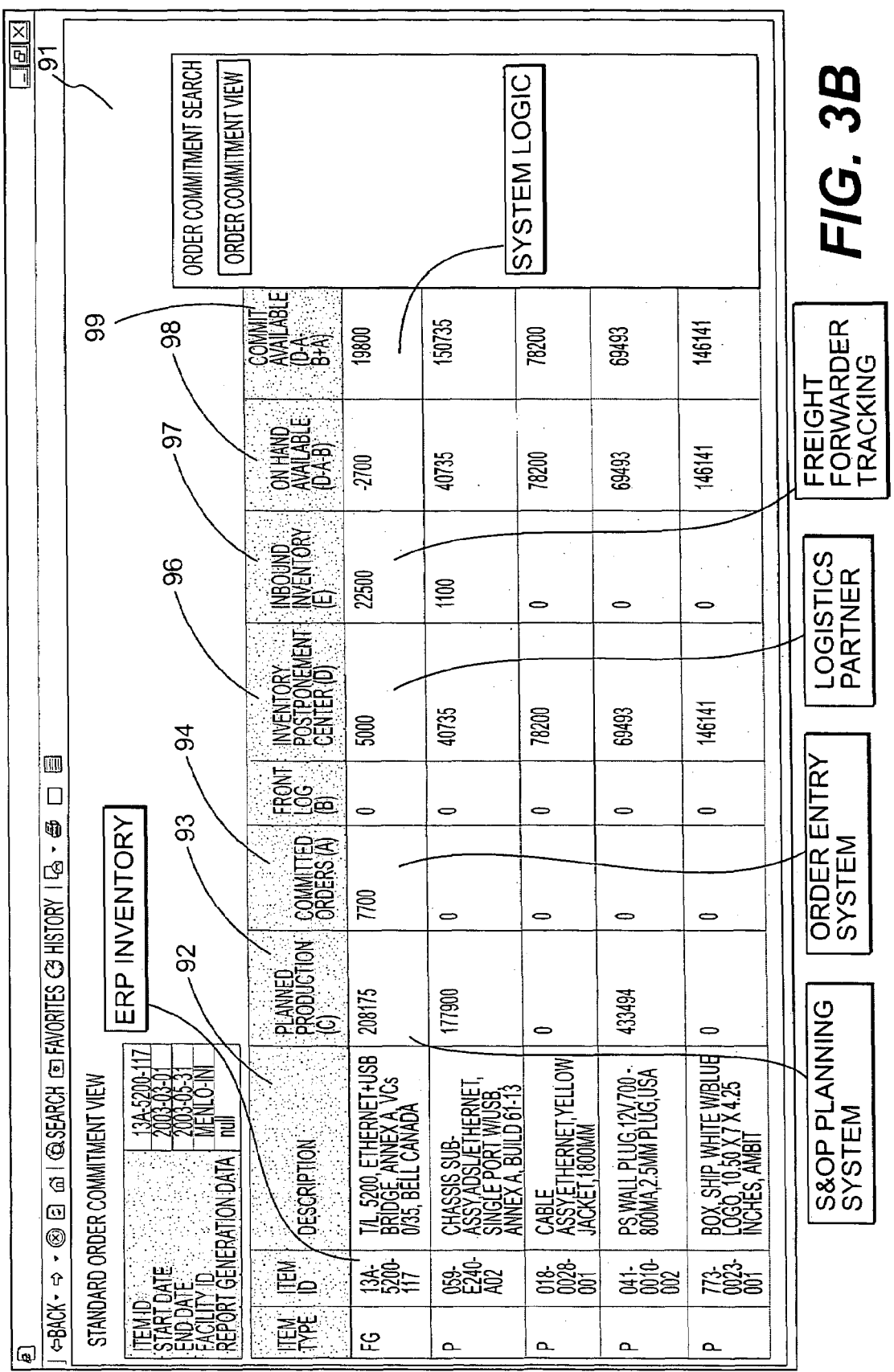
FIG. 3B illustrates a structured, role-based order commit executed in real-time using the system of FIG. 3A.

FIG. 3B illustrates a structured, role-based order commit 91 executed in real-time using the system 50 of FIG. 3A. The order commit 91 is shown displayed on a GUI, such as the GUI 90. The order commit 91 is a view useable by an organization master planner who is attempting to view in real-time, all inventory data related to a planned production of a communication network so as to optimize the planning process. Although the order system 50 of FIG. 3A is shown to have displayed the order commit 91 as a GUI, one of ordinary skill in the art will appreciate that the order commit may be generated using many other communications media, including a machine-readable structured Xschema to a computer device, a text document, and any other computer-generated document, for example.

Returning to FIG. 3B, the order commit 91 shows production and other data for a number of communications devices. In particular, the displayed data list the device description 92, planned production 93 based on the manufacturer's commitable record of planned production (either S&OP or plant level build plans), the number of devices currently committed 94 (i.e., the number of devices that the manufacturer has committed for delivery), the on-hand inventory 96 (i.e., the physical number of devices currently warehoused), the inbound inventory 97 (i.e., the number of devices in transit to the warehouse), and the on-hand available 98. The on-hand available 98 is the sum of the currently committed devices 94, and the on-hand inventory 96, which in the example shown in FIG. 3B is —2,700 devices. Using these data, the order commit system 50 may be used by various members of the order commitment network to determine the number of devices (commit available 99) that are available to promise for delivery. Specifically, the order commit 91 shows the commit available 99 as 19,800 devices, which is the sum of the on-hand inventory 96, the devices currently committed 94, the inbound inventory 97, and the on-hand available 98. The order commit 91 is but one possible view of the data available from multiple, unrelated data sources in an order commit network. More specifically, the order commit 91 is a view of the data based on a role of the user (machine or human) requesting the data. For example, the order commit 91 may be a view useable by a manufacturer of a communications network to determine how many devices would be available to support completion of the communications network. Furthermore, as will be described later, the order commit 91 is produced in real-time, and shows specifics related to the availability of the devices so that the manufacturer is assured that the commit available 99 value is accurate and precise. Because the members of the order commit network can trust the data represented by the order commit 91, the members can substantially reduce buffers of inventory, schedule plant production runs more precisely, and leverage the use of transport capacity more productively while improving customer service levels.

FIG. 3C illustrates another version of the order commit of FIG. 3A showing additional details of inbound inventory. The details include a specific listing of the discrete freight forwarding shipments calculated ETA (estimated time of arrival and quantity) are displayed for the inventory supervisor. In the example shown, estimate times of arrival (ETAs) are actually calculated by comparing the purchase order (PO) request date to the likelihood the final shipment leg will be on-time. If the shipment ETA is later then the PO request date, the later date is used in the display and order commit calculation.

Figure 4A:
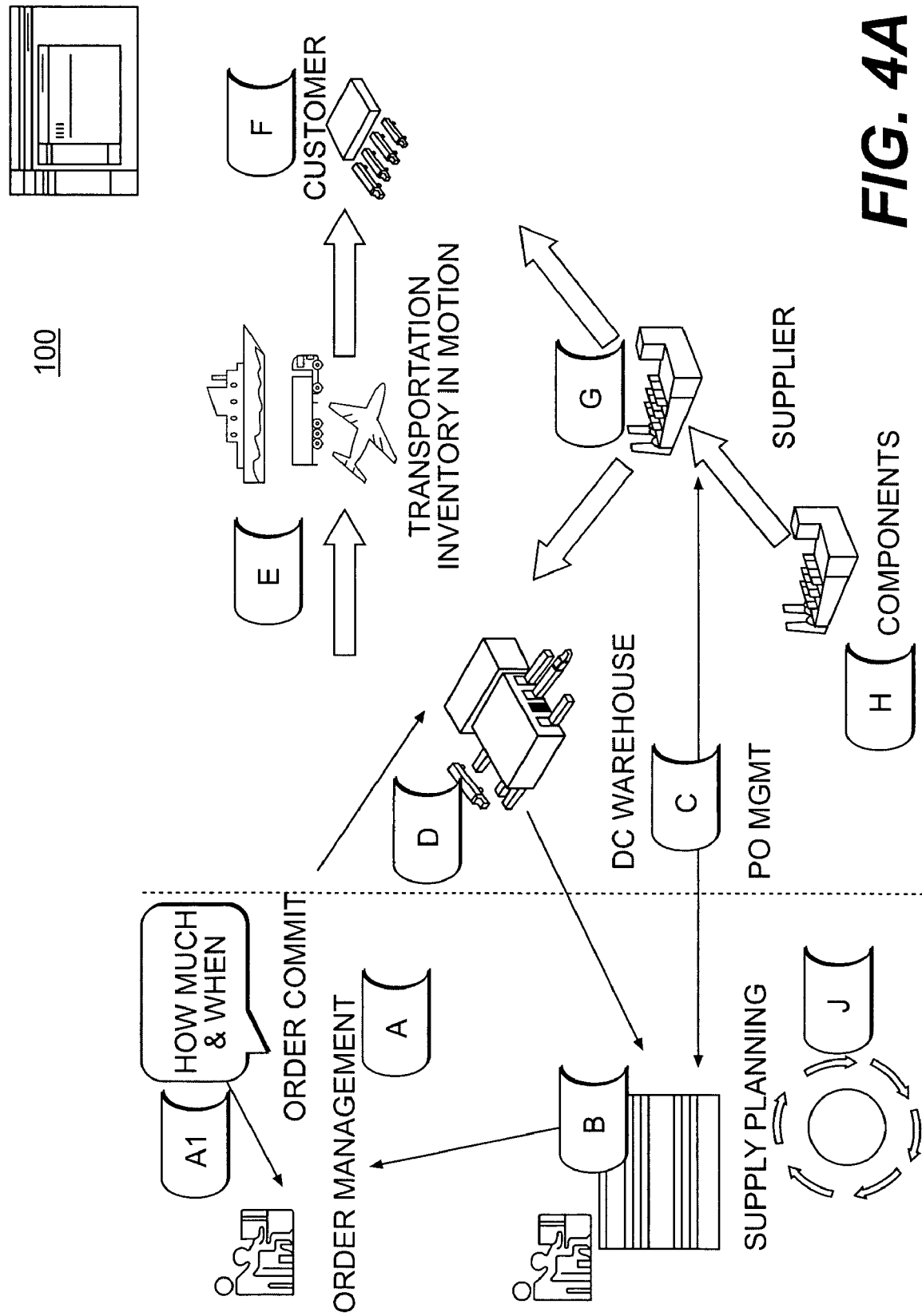
FIG. 4A is an overview of order commitment network showing various aspects of order fulfillment and various sources of order commitment data.

The order request and commitment system 50 may be used in a supply chain network to provide accurate, precise order commitments. FIG. 4A is an overview of order commitment network 100 showing various aspects of order fulfillment and various sources of order commitment data. The network 100 also reflects the order commitment model. That is, the network 100 represents the flow of goods and services, and corresponding information related to those goods and services. Furthermore, the network 100 may be represented, through use a graphical user interface (GUI), as an order commitment tool that allows users to view concurrent information across the entire network 100 and to display information specific to the needs of the user's unique role or activity in the network 100. The use of such a GUI will be described later in detail.

In the network 100, each node or corresponding source, such as warehouse management, freight forwarding, and order entry, has its own schema definition of relationships. The order commitment system 50 (see FIG. 3A) provides real-time mapping of these sources thorough direct connections and through web services without physically moving and restoring (persisting) the data from one database to another database and without creating one central data warehouse to re-store all the relevant data from the node databases.

FIG. 4A is a order commit system-generated logical Business Process Management (BPM) display of the concurrent information flows in a typical outsourced fulfillment business model and an overview representation of the physical flow of goods from suppliers to the consumer. As shown in FIG. 4A to the left of the dashed line, a sale and operations master planner at B and a order fulfillment clerk at A1 function as information resources to enable generation of an available-to-promise (ATP) order, or simply, and order commitment. To the right of the dashed line are shown various members of the network 100, including component manufacturer at H, supplier at G, warehouser at D, transporter at E, and customer at F. The large arrows represent the flow of goods and services, as well as information related to those goods and services; the small arrows represent the flow of other information. The existence of arrows between network members also implies the existence of links between the members. Associated with each of these network members is a view (i.e., flags C-H) into the order commit system. The views are unique to a specific member, and are designed to present that member with information of relevance to the member. Using these views, each network member can at anytime drill down into the concurrent information flows between enterprises with tailored views structured to support their job decisions or systems to view a specific role (job)-based order commit presentation of data to support order fulfillment decisions. For example, the link (information flow) between E and F in FIG. 4A would display logistics messages for tracking, the timeliness of the data and how the data relates to an order and inventory being fulfilled. Flag A1 provides an order management staff the ability to view all supply chain activity and to commit a reliable date of backorder delivery for a customer rather than just backordering a product without any knowledge of when material would be available for the backorder.

FIG. 4B illustrates the improvement in working capital/inventory management that can be achieved using a network such as the order commitment network 100 of FIG. 4A. In general, satisfying supply chain customers (i.e., achieving a high customer service level approaching 100 percent) requires a supplier to maintain some level of on-hand inventory. Naturally, from a cash flow perspective, the supplier would like to minimize the on-hand inventory. In prior art systems, illustrated by performance curve A, the on-hand inventory, even to achieve moderate customer service levels, is high, and increases sharply as the supplier attempts to achieve near-100 percent customer service levels. Improving the supplier's production master plan can shift the performance curve lower, as shown by curve B. However, even with an improved master plan, a large on-hand inventory may be needed to achieve the desired customer service level. One cause of this problem is the lack of current, accurate, and precise information regarding the status of goods and services being provided. In prior art systems, the lack of current, accurate, and precise information available to decision makers results primarily because of poor communications channels and inadequate methods, devices, and systems with which to extract information from the multiple, unrelated data sources that comprise a supply chain network. Without good information as to availability of goods and services, decision makers often compensate by holding excessive inventory or not fully using production or logistics capabilities.

Performance curve C shows the improved inventory/customer service level performance possible using the order commitment systems and methods disclosed herein. Using the disclosed order commitment systems and methods, a user can actually achieve a zero inventory or negative working capital by properly linking the order commitment Xschema to a supplier's inventory levels and then shipping inventory from the supplier to a customer. If the user then establishes longer payment terms to suppliers than the user allows from the customer, the user can create a negative working capital situation. This example of exploiting the order commitment systems and methods is possible because of the vastly improved accuracy, precision and timeliness of information flows made possible by these order commitment systems and methods. Thus, as can be seen from curve C, the ability to provide on-demand, real-time, accurate and precise information to decision makers in the order commitment network (such as the network 100 of FIG. 4A) allows for greatly improved inventory performance relative to customer service levels. Thus, as shown by curves A-C, traditional software solutions send to move the inventory along curve A but fundamentally do not address that "intercompany" inter-enterprise communication and collaboration that is the key to "shifting the curve." When a seller can trust that a supplier will meet promise dates to customers, the seller can hold less inventory and the supplier can utilize capacity and materials more wisely (curve C). If the communication cannot be trusted, for any reason, the importance of customer service forces excess inventories to be held.

Figure 5:
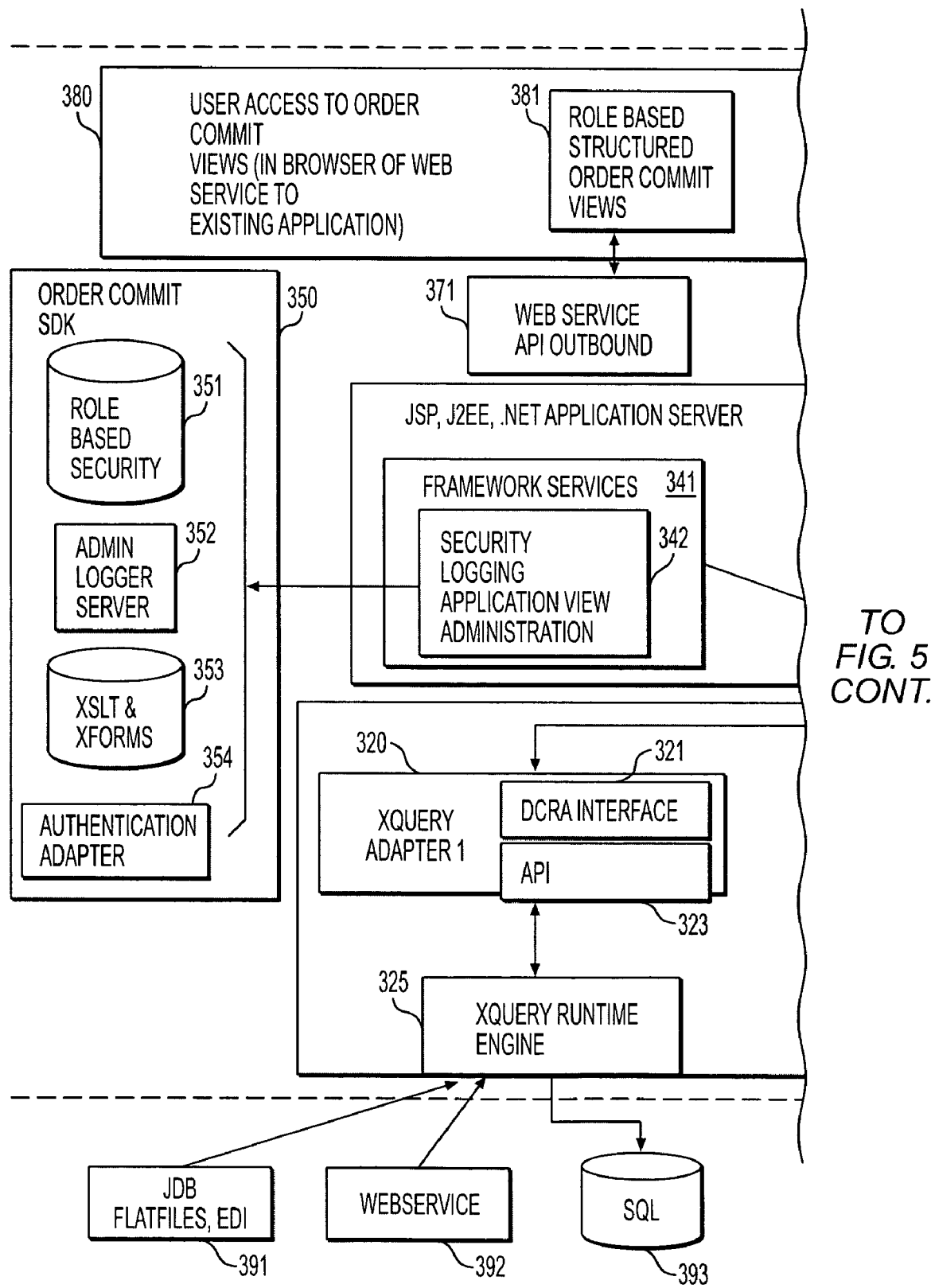
FIG. 5 is a block diagram of an exemplary order commit architecture used with the order commitment network of FIG. 4A.
Figure 5:
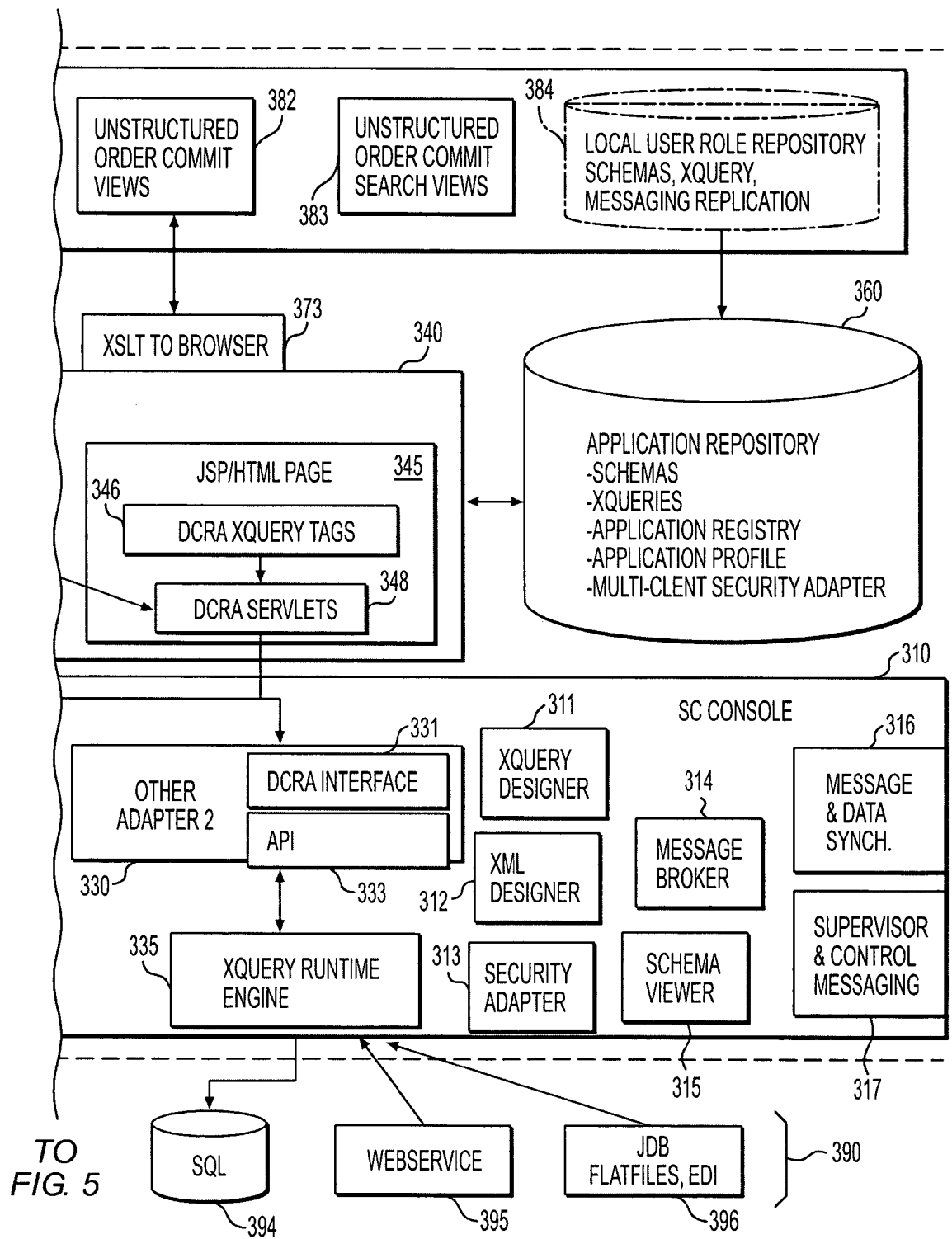

FIG. 5 illustrates an exemplary order commit architecture 300 coupled to external data sources 390. The architecture 300 may be installed on a networked server, which may be accessible by other network devices. Alternatively, elements of the architecture 300 may be installed on other network devices, or local terminals, that are coupled to the networked server. When the elements of the architecture 300 are installed locally, the Xschema and XML data feeds can be replicated on the local terminal to allow a user to bypass the architecture's server. The other network devices may use the architecture 300 to obtain various views of the order commit process. The other network devices may include a personal computer, for example, and an operator (i.e., human) of the personal computer may use the architecture 300 to obtain a desired view (e.g., purchase order status) of the order commit process. Another network device may query the architecture, without direct human direction or intervention, to obtain information related to the order commit process. That is, a computer or similar device may be programmed to obtain an order commit view periodically, or upon the occurrence of a specific event. Relationships reflected in the Xschema can be replicated on the basis of on-demand requests, or periodic synchronization of data from the Application Repository 360 and a user's local terminal.

The order commitment architecture 300 properly represents, but "hides" from the user, the algorithmic and messaging synchronization complexity of presenting concurrent information flows while providing the user with precise and accurate order commitments. This is a critical improvement over prior art supply chain and manufacturing systems that rely on increasingly complex operations research algorithms or black boxes to produce answers. The order commitment system presents a simple to use interface but also allows, at anytime there is the ability to peg or audit the data or algorithm trail that led to a supply chain decision. The architecture 300 allows the user to quickly implement its features by simplifying complex supply chain relationships, and allows the user to add increasingly complex relations and data requests as the user gains confidence in the results provided.

The data sources 390 may include any data source capable of transmitting digital information. Examples of such data sources include SQL data, SQL data via JDBC, flat files, XML, XML Web Services Description Language (WSDL) files, and ANSI EDI files 391, 396; web service WSDL enabled applications 392, 395, and SQL data sources 393, 394. One of ordinary skill in the art will recognize that many other types of data sources may communicate and work with the architecture 300. The data sources 390 may be maintained at one or more external partners in the supply chain. Access to the data sources may be permitted under an agreement between an external partner and the architecture 300 operators. Data in the data sources 390 may be structured, and may be compatible with the Xschema employed by the architecture 300. Alternatively, the data may be unstructured, and may require mapping to the Xschema used by the architecture 300.

The data sources 390 include external partner data feeds. The external partner data feeds may be provided electronically in digital format expressed as spread sheets, XML documents, CSV documents, and SQL documents. The external partner data feeds may be provided periodically, on-demand, or a combination of periodically and on-demand. The external partner data feeds may include shipping data, delivery schedules, manufacturing specifications, and any other data needed to make an order commitment. The external partner data feeds are provided to SC console 310, and may be stored in its original format in external system databases, awaiting processing in the architecture 300. Supply chain execution data derived from the external partner feeds are then reformatted, validated and synchronized, using components of the architecture 300, to produce planning services data, and similar data views. The planning services data, and similar data, may be stored in a common format, and may allow for automated or manual changes. The planning services data, and similar data, may be organized to support discrete supply chain-related documents and services, including purchase orders and inventory, for example.

The architecture 300 includes supply chain (SC) console 310, application server 340, software development kit 350, application repository 360, and access module 380. The SC console 310 serves as a means for interfacing with the external data sources 390 to access data from these data sources, translating the data into a schema used in the order commit architecture 300, and formulating and executing queries of the data sources 390. The SC console 310 includes means for the mapping data sources 390 into the order commit schema. Such means include Xquery designer 311 and XML designer 312. Also included in the SC console 310 are means for providing security for transactions involving the data sources 390. Such means includes security adapter 313. The SC console 310 further includes means for controlling messaging between the architecture 300 and the data sources 390. Such means include service oriented architecture message flow and message broker 314, message and data synchronization module 316, and supervisor and control messaging module 317. The SC console still further includes schema viewer 315 to allow access to the order commit schema. Finally, the SC console 310 includes means for executing queries of the data sources. Such means include Xquery run time engines 325 and 335, and Xquery adapters 320 and 330. The Xquery adapter 320 includes DCRA interface 321 and API 323. The Xquery adapter 330 includes DCRA interface 331 and API 333.

Much of the data mapping in the SC console 310 is performed automatically using continual polling of the data sources and through the Xquery designer 311 and the XML designer 312. Some mapping may also be performed manually using Xquery and traditional data mapping tools. For example, a human may access a user interface that illustrates a schema of a data source, and the user may then, using computer-generated tools, associated specific data elements to a schema used by the order commit architecture 300. The Xquery designer 311 is used to automatically map data from webservice 392, 395. For example, a package delivery service may provide tracking data by reading a RFID tag using standard or non-standard EPC code (e.g., shipment identification, status, and arrival date) through a WSDL API to the order commit system. The tracking data may be in the form of data tags and names of data. The data tags and names can then be related to the schema used by the architecture 300. More specifically, the architecture 300 may use Xschema, and the Xschema may include a shipment tracking identification, status, and estimated date of arrival. The Xquery designer 311 can then automatically map the delivery service's tracking data to the Xschema shipment tracking identification, status, and estimated date of arrival. Such automatic mapping may be accomplished in the Xquery designer by, for example, comparing data names and tags from the delivery service's data to fields in the Xschema. Furthermore, the automatic mapping accounts for differences in the data being mapped. For example, the Xschema may specify a field of fourteen characters for the shipment identification while the delivery service's identification may include only ten characters. To allow for precise mapping, the Xquery designer 311 could add four zeros at the head of the delivery service's identification so that all fourteen character spaces are filled in the Xschema. Many other mapping tools are available for use by the Xquery designer 311.

XML designer 312 is used to map non-XML-formatted data into XML format for use in the Xschema of the architecture 300. That is, the XML designer 312 converts data into XML format, and then maps the converted data to the architecture's Xschema. Once the XML designer 312 converts the data into XML format, the mapping proceeds as described above for the Xquery designer 311.

The schema viewer 315 provides a view into the Xschema used by the architecture 300. The view can be in a form that can be read and understood by a human user. The schema viewer 315 allows the user to see how order commit data relates to data from the data sources, and how segments of the order commit data relate to each other. Using the schema viewer 315 and various computer tools, a human user can execute manual mapping of data from one of the external data sources to the Xschema.

The various services that constitute the data sources 390 may include security measures to, for example, limit access to data and processes used by the services. For example, an external partner may use an application that incorporates various security measures. The SC console 310 may use these security measures when managing access to data from the external partner's data source. Alternatively, the SC console 310 may provide its own security measures, particularly in the absence of security measures at the data source level. Examples of security measures include a log-on identification, including a user name and identification. The security adapter 313 within the SC console 310 determines if security measures implemented in the external application should be used, or whether to invoke security measures provided by the SC console 310. For example, the security adapter 313 may limit access to query data from a specific data source to only those individuals or machines that possess a specific password and log-on name. The security adapter 313 may establish role-based access such that, for example, an organization's warehouse managers would be able to access certain inventory and shipping data, but would not be able to access certain financial data, which could be restricted to the organization's financial services personnel (e.g., a chief financial officer). The security adapter 313 can also implement access restrictions based on a users identification as a "normal user" or as a "system administrator." The security adaptor 313 also supports multiple clients and multiple projects within a client, which is often required by logistics and manufacturing service firms that wish to use one order commit system for many clients and for multiple projects within a client.

The message broker 314 translates messages between disparate applications and guarantees message delivery. The message broker 314 provides one-to-one, one-to-many, and many-to-many asynchronous or synchronous exchange of self-morphing objects between heterogeneous components, and ensures message delivery using a guaranteed delivery message-based infrastructure. The message broker 314 also integrates with databases to perform message logging, data merge, and database update functions. Thus, in a network such as the network 100 shown in FIG. 4A, where programs communicate by exchanging formally-defined messages (that is, through the act of messaging), the message broker 314 is an intermediary program that translates a message from the formal messaging protocol of the external partners to the formal messaging protocol of the order commit architecture 300. However, as more external partners turn to use of an extended Service Oriented Architecture (SOA) that implement interface such as WSDL services, the need for the message broker 314 will decline. The SC console 310 fills this need to not only manage messages executed, but to also monitor the availability and accuracy of data and information outside the information user's operational authority but critical to make decisions. For example, excess capacity and load factors of deep water ships from Taiwan to the U.S. may be an early indicator of the potential for lower tarrifs but this information is not managed and controlled by the user. SC console 310 and the use of the SOA and webservices allow this information to be used reliably.

The message and data synchronization module 316 allows a local user to establish and persist the same Xquery relationships on the local user's terminal as are established and persisted on the SC console 310 and the application repository 360. That is, the module 316 synchronizes data between the application repository 360 and local user repository 384. Using the module 316, the local user can personalize the order commit views that can be generated using the architecture 300. For example, the local user may receive order commit data in real-time, or on a batch basis, but only needs to review the order commit data periodically (e.g., weekly). Moreover, the local user can tailor the views to exactly match the local user's individual needs in terms of data precision and accuracy, types of data presented, and complexity of the view. The local user can also arrange for views to be provided periodically, upon the occurrence of defined events, or on an ad hoc basis. Using the module 316, the order commit data may be interrogated to determine its relationships to other data in the order commit network.

The supervisor and control messaging module 317 tracks receipt of information from the data sources 390. For example, the module 317 determines the date and time of receipt of data from the data sources 390. Using this example, the module 317 can provide a user with information related to the latency of the data received from the data sources.

The Xquery adapters 320 and 330 operate with the Xquery run time engines 325 and 335 to extract information from the data sources 390 based on the Xschema and the requests of users of the architecture 300. The Xquery adapters 320 and 330 generate XML-coded queries based on the specific views that a user may request. The DCRA interfaces 321 and 331 within the adapters 320 and 330, respectively, communicate with messaging-based application server 340 to receive the requests in a JSP/HTML page format, for example. Source data is converted to standard XML tagged data and then is mapped to the Xschema through a compiled version of Xquery maps that relate the source data to the order commit Xschema. The APIs 323 and 333 serve as an interface to the Xquery run time engines 325 and 335, respectively. The Xquery run time engines 325 and 335 maintain a copy of the maps into the Xschema generated by the Xquery designer 311 and the XML designer 312. With the data maps, the Xquery run time engines 325, 326 effectively act as "listening devices," waiting for information to flow in from the data sources 390. When data arrives at the Xquery run time engines 325, 335, the engines use the maps to allocate the data to the appropriate fields in the Xschema. For example, if the shipping company previously mentioned sends a shipment identification along with an updated delivery date, the appropriate Xquery run time engine 325, 335 will receive the delivery date information, allocate the delivery date information to a field in the Xschema, and send the allocation to the messaging-based application server 340.

The server 340 translates between the Xquery adapters 320, 330 and the user access module 380. More specifically, the execution flow of an Xquery from data sources 390 to final views in the user access module 380 begins when the data sources 390 are mapped according to the Xschema and the results aggregated. The aggregated results can then be searched using the Xschema and the Xquery run time engine 320, 330 (using APIs 323, 333) to execute an query of the aggregated results. The result of the Xquery is in XML format, and consequently, an XML stylesheet language transformation (XSLT) process is executed in the server 340 to transform the XML data into a human-readable view (i.e., JavaScript Page (JSP)) using custom JSP Tags, which are defined in a Java tag library.

As is well-known in the art, a transformed document according to the XSLT process is expressed as a well-formed XML document conforming to the Namespaces in the XML language, which may include both elements that are defined by XSLT and elements that are not defined by XSLT. XSLT-defined elements are distinguished by belonging to a specific XML namespace. A transformation expressed in XSLT describes rules for transforming a source into a result. The transformation is achieved by associating patterns with templates. A pattern is matched against elements in the source. A template is instantiated to create part of the result. The result is separate from the source, and the structure of the result can be completely different from the structure of the source. In constructing the result, elements from the source can be filtered and reordered, and arbitrary structure can be added.

A transformation expressed in XSLT is called a stylesheet. This is because, in the case when XSLT is transformed into the XSL formatting vocabulary, the transformation functions as a stylesheet. A stylesheet contains a set of template rules. A template rule has two parts: a pattern which is matched against nodes in the source and a template that can be instantiated to form part of the result. This allows the stylesheet to be applicable to a wide class of documents that have similar source structures.

A template is instantiated for a particular source element to create part of the result. A template can contain elements that specify literal result element structure. A template can also contain elements from the XSLT namespace that are instructions for creating result fragments. When a template is instantiated, each instruction is executed and replaced by the result fragment that the template creates. Instructions can select and process descendant source elements. Processing a descendant element creates a result fragment by finding the applicable template rule and instantiating its template. Elements are only processed when they have been selected by the execution of an instruction. The result is constructed by finding the appropriate template rule and instantiating the associated template.

The order commitment application repository 360 includes a collection of all the relationships of data as XML or Xqueries within the Xchemas, as well as an application registry, an application profile, and multi-client security information. The application registry persists an application's configuration information. As an optional feature, the order commitment architecture 300 can provide a structured query language (SQL)-based implementation of the Xquery XML mapping of the data from the data sources 390. This is used for deployment when a heavy emphasis is on a batch data sales and operations planning process where parts of the core data must be re-persisted in order to get a synchronized view of data. Sometimes this data can only be synchronized quarterly. However the goal of order commit is to allow this data to be synchronized as often (up to real time) in order to allow the user to create a competitively advantaged ability to manage working capital. In general, prior art systems use quarterly/monthly planning.

The user access module 380 includes individual modules 381, 382, and 383 to allow unstructured and structured searches of the data sources 390. The user access module 380 facilitates various views of supply chain and order fulfillment information. These views allow different types of users to commit to any specific order, to track data, and to view query results. For example, a planner may use an order commitment view while a sales person may use a customer demand view. These views are the interface between the order commitment application and the user, and may be generated using JavaScript Pages and XML stylesheet language transformations. Thus, at various times during processing to the data derived from the external partner data feeds, a user is able to "access" the data using the views and attainment. For example, the user can access the supply chain execution data using a supply chain execution status view, the planning services data using an order commit view, and the overall planning services using partner master plan view.

The various views allow users to examine, parse, and explore key data in tailored specific views as well as examine data presented by their outsource supply chain partners information systems. Unstructured views and searches allow for summarization of specific views using the order commitment architecture to aggregate and coordinate the data into appropriate categories.

Examples of such aggregating include structuring owned inventory together, all committable inventory but "non-owned" together, planned production from a variety of master plan, work-in-process sources, and in-transit inventory status from various sources. These views provide accurate information but do not attempt to force data into precision that causes incorrect decisions. For example, a company's available to promise (ATP) calculation adds on-hand inventory and to-be-built inventory within a specified period, and subtracts committed orders for the period. However, without accurate, real-time information flows from the company's external partners, the ATP calculation may lead to erroneous decision-making and erroneous order commitments. In this example, if the company receives an order for 100 units and shows 90 available in on-hand inventory, the company in the past might have indicated a back order of 10 units. However, using the architecture 300, the same company would see that 200 units are inbound with a specified arrival time. Using this additional real-time shipping information, the same company can provide an order commit that exactly satisfies its customer's request.

Role based views are those which help users make decision in their specific jobs. For example, a customer demand view would help a sales person take decisions on forecasting the demand. The order commitment system provides an ever expanding capability to present common relationships of data in customized and unique ways to make the data and view relevant and valuable to the human user.

Finally, structured views are pre-defined, real-time views that provide summary as well as detailed information with drill downs provided on summary records. For example, a user that only knows a customer's name or name fragment can request an initial search to find all data items that relate to that name or name fragment. The data from this search result is presented to the user as an unstructured order commit search view 383. The user can then use the view 383 to locate all listed purchase orders for the data items. The user can then "drill down" on the purchase orders linked to the data items and find a bill of lading for the transport provider that will carry the associated goods. The user can next "drill down" on the bill of lading to find the estimated time of arrival of the shipments. Using this shipping information, the user can then commit to delivery of goods to a customer even though the goods are still in transit to the user. These views heavily use the order commitment Xschema (see FIGS. 6A and 6B) in real-time by aggregating various information feeds and then relating them instantly and presenting a decision for order commitment. Aggregation of source data, the transformation, the concurrent use of data, and the calculations or algorithms are mapped in the SC console 310 to link the source data to the order commit Xschema. Depending on rules used to model the supply chain private exchange trading partner's total aggregation of on-hand inventory, committable partner inventory, in-transit inventory, planned production, and other factors, are linked, aggregated, transformed and reported in an on-demand basis without intermediate persistence of the data.

The user access module 380 includes a number of interfaces and local user repository 384. Use of the local user repository 384 was described above. In particular, the local user repository 384 allows for synchronization of loosely coupled data between the application repository 360, which may be established on a networked server, and the local user's terminal, which may be, for example, a personal computer networked to the server. Using the local user repository 384, the local user can launch an Xquery of the data sources 390 in order to get a desired view (e.g., unstructured search, structured, and role based order commit views) of the order commit data.

The interfaces include role based structured order commit views 381, unstructured order commit views 382, and the unstructured order commit search views 383. As discussed above, the unstructured order commit search view 383 allows for a search of loosely coupled, unstructured data across the order commit network. For example, the user may desire shipping status from a specific carrier, but may not know the identity of the carrier. In addition, the user need not specify a particular product, ship date, or carrier transaction number. The architecture 300 will then operate to return all the shipping data associated with all carriers that is pertinent to the local user. The unstructured order commit view 382 allows more refinement in retrieving data from the data sources. For example, the user may specify a specific carrier, or a type of product.

The role based structured order commit views 381 allow even greater refinement. In addition, the role based structured order commit view 381 displays information in a format that is customized to the exact role specified by the user (e.g., warehouse supervisor).

Figure 6A:
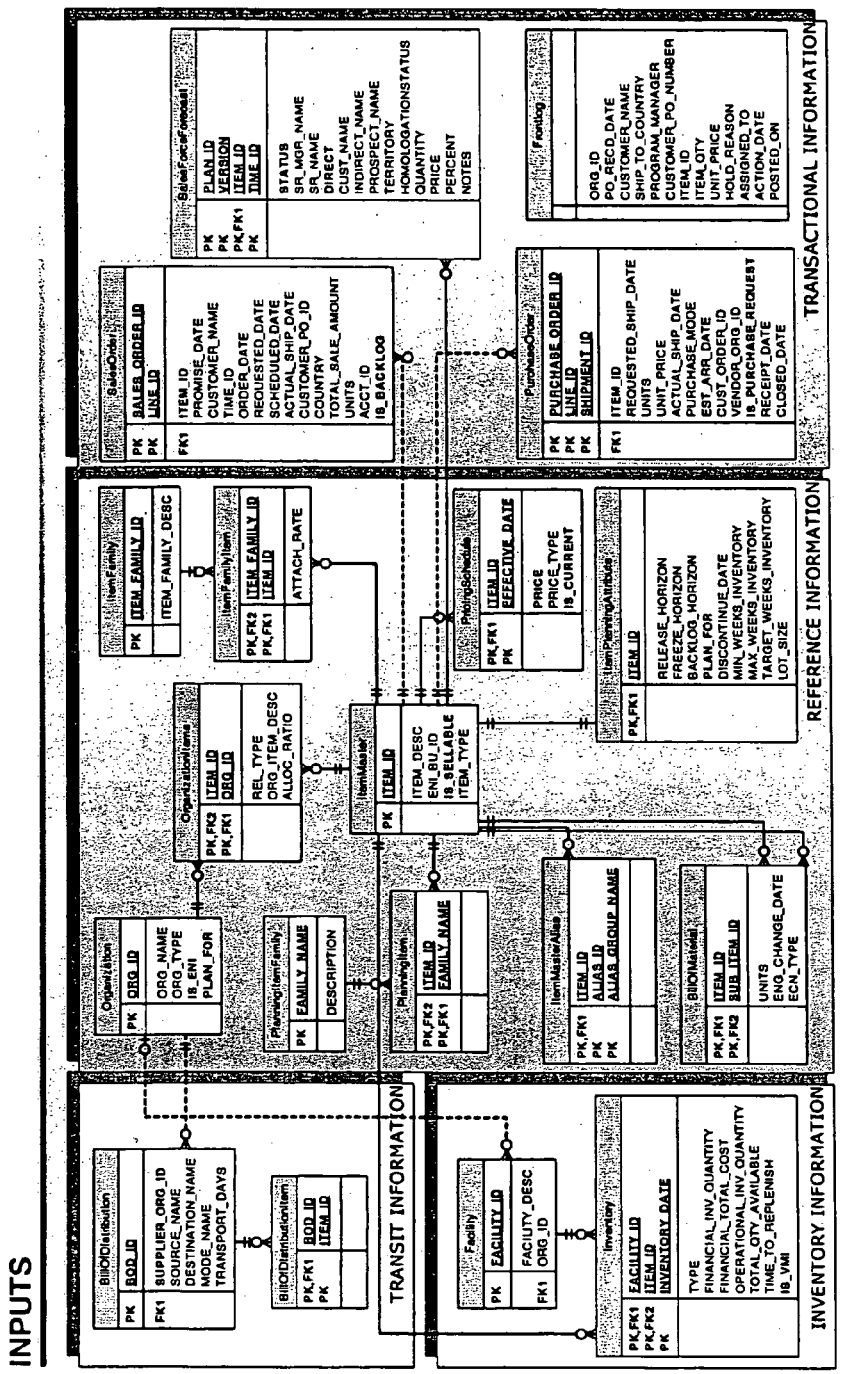
FIGS. 6A and 6B illustrate an order commit Xschema used with the architecture of FIG. 5.
Figure 6B:
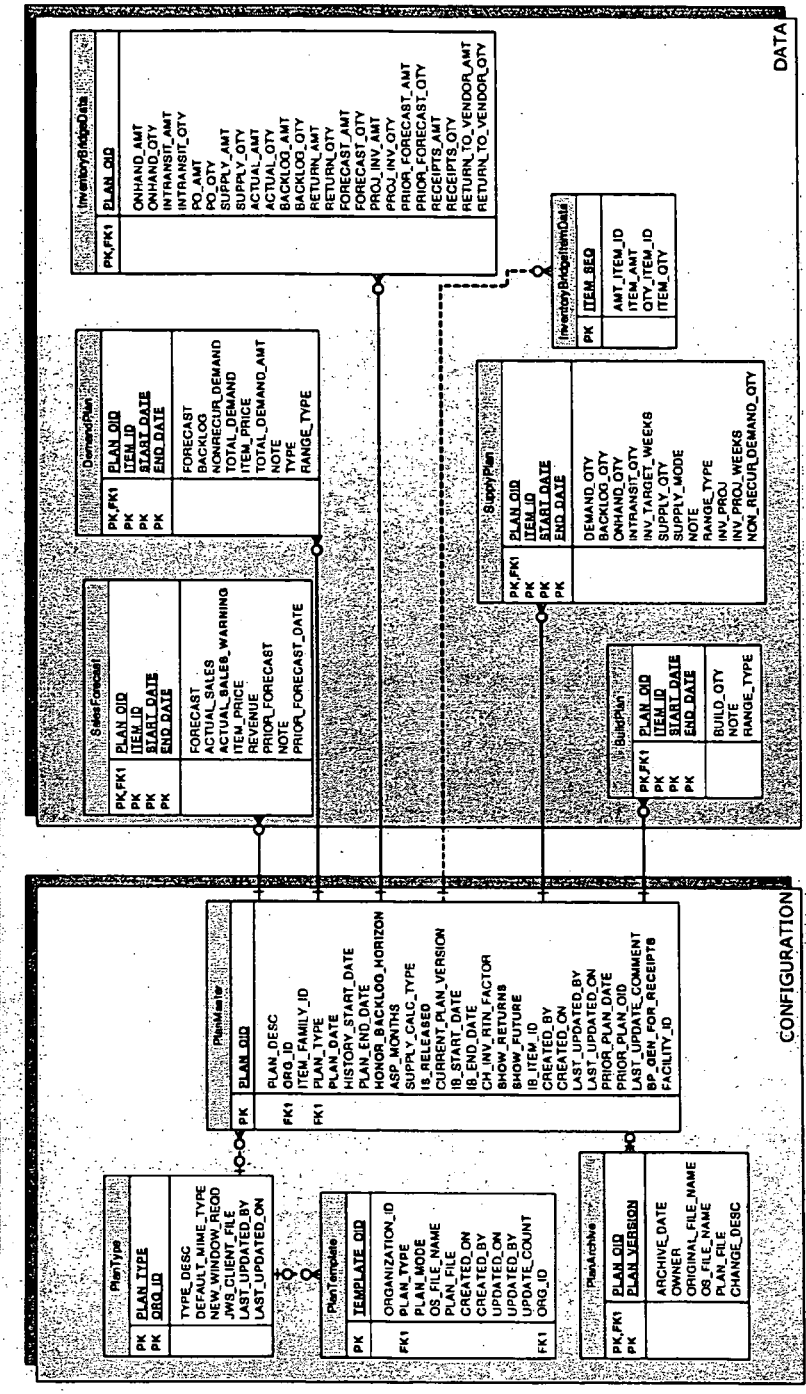

FIGS. 6A and 6B illustrate an exemplary Xschema 399 used by the architecture 300 of FIG. 5. The Xschema 399 represents the XML/Xquery reference to data from the data sources 390. All relationships between the data sources 390 and the architecture 300 are enforced by the Xschema 399. The Xschema 399 is created using the SC console tools and the Dynamic Logistics Synchronization and Visibility (DLSV) SDK 350. The Xschema is persisted in the application repository 360, and may be concurrently and synchronously maintained in the repository 384.

As noted above, in the SC console 310, a number of disparate data sources, including a text file, a spreadsheet, an XML message, and data in a relational database are mapped into an XML schema (Xschema) 399. The Xquery run time engines of FIG. 5 can then be used to query the mapped data sources, returning a result in XML format. The XML-formatted result is then transformed using XSLT to a JSP document for ease of interpretation by a user. The order commit Xquery process relies on the transformation and aggregation of data according to a common schema, such as the Xschema. The transformation is based on a known schema of the original data. A schema defines a class of documents or data. The order commit Xschema 399 defines a class of XML documents or data. An "instance document" is a document conforming to a particular schema. Neither instances nor schemas need to exist as documents per se—they may exist as streams of bytes sent between applications, or as fields in a database record, for example.

Shown below is an example of an Xquery related to current inventory:

Each of the elements in the schema has a prefix xsd: that is associated with the Xschema namespace through a declaration that appears in the schema element. The prefix xsd: is used by convention to denote the Xschema namespace, although any prefix can be used. The same prefix, and hence

```
<Inv>
{
    for $PLAN.SOP_INVENTORY_1 in document ("PLAN")/db/PLANNING/SOP_INVENTORY
    let $cast_as_xs:string_3 := cast as
xs:string($PLAN.SOP_INVENTORY_1/INVENTORY_DATE)
    for $PLAN.SOP_FACILITY_5 in document("PLAN")/db/PLANNING/SOP_FACILITY
    for $PLAN.SOP_ITEM_MASTER_6 in document("PLAN")/db/PLANNING/SOP_ITEM_MASTER
    where ($PLAN.SOP_INVENTORY_1/FACILITY_ID eq $PLAN.SOP_FACILITY_5/FACILITY_ID)
        and ($PLAN.SOP_INVENTORY_1/ITEM_ID eq $PLAN.SOP_ITEM_MASTER_6/ITEM_ID)
        and xf:contains($PLAN.SOP_INVENTORY_1/ITEM_ID,$#PARAM_ITEM_ID of type xs:string)
    return
        <SOP_INVENTORY>
            <FACILITY_ID>{ xf:data($PLAN.SOP_FACILITY_5/FACILITY_ID) }</FACILITY_ID>
            <ITEM_ID>{ xf:data($PLAN.SOP_INVENTORY_1/ITEM_ID) }</ITEM_ID>
            <INVENTORY_DATE>{ xf:substring-before( treat as
xs:string($cast_as_xs:string_3), "T") }</INVENTORY_DATE>
            <TYPE>{ xf:data($PLAN.SOP_INVENTORY_1/TYPE) }</TYPE>
            <FINANCIAL_INV_QUANTITY>{
xf:data($PLAN.SOP_INVENTORY_1/FINANCIAL_INV_QUANTITY) }</FINANCIAL_INV_QUANTITY>
            FINANCIAL_TOTAL_COST>{ xf:data($PLAN.SOP_INVENTORY_1/FINANCIAL_TOTAL_COST)
}</FINANCIAL_TOTAL_COST>
            <OPERATIONAL_INV_QUANTITY>{
xf:data($PLAN.SOP_INVENTORY_1/OPERATIONAL_INV_QUANTITY) }</OPERATIONAL_INV_QUANTITY>
            <TOTAL_QTY_AVAILABLE>{ xf:data($PLAN.SOP_INVENTORY_1/TOTAL_QTY_AVAILABLE)
}</TOTAL_QTY_AVAILABLE>
            <TIME_TO_REPLENISH>{ xf:data($PLAN.SOP_INVENTORY_1/TIME_TO_REPLENISH)
}</TIME_TO_REPLENISH>
            <IS_VMI>{ xf:data($PLAN.SOP_INVENTORY_1/IS_VMI) }</IS_VMI>
            <FACILITY_DESC>{ xf:data($PLAN.SOP_FACILITY_5/FACILITY_DESC)
}</FACILITY_DESC>
            <ITEM_DESC>{ xf:data($PLAN.SOP_ITEM_MASTER_6/ITEM_DESC) }</ITEM_DESC>
        </SOP_INVENTORY>
        sortby(ITEM_ID ascending,FACILITY_ID ascending)
    }
</Inv>
```

FIG. 7 shows a purchase order instance document po.xml, which is contained in a file po.xsd (not shown). The instance document po.xml describes a purchase order. The purchase order includes a main element, purchaseOrder, and the sub-elements shipTo, billTo, comment, and items. These sub-elements (except comment) in turn contain other sub-elements, and so on, until a sub-element such as USPrice contains a number rather than any sub-elements. Elements that contain sub-elements or carry attributes are said to have complex types, whereas elements that contain numbers (and strings, and dates, etc.) but do not contain any sub-elements are said to have simple types.

The complex types in the purchase order instance document, and some of the simple types, are defined in the schema for purchase orders. The other simple types are defined as part of XML schema's repertoire of built-in simple types.

The purchase order instance document does not mention the purchase order schema. An instance document is not actually required to reference a schema, and although many will, any processor of the instance document can obtain the purchase order schema without any information from the instance document. The SC console 310 (see FIG. 5) includes explicit mechanisms for associating instances and schemas.

The purchase order schema is contained in the file po.xsd. The purchase order schema consists of a schema element and a variety of sub-elements, including element, complexType, and simpleType, which determine the appearance of elements and their content in instance documents.

the same association, also appears on the names of built-in simple types, e.g. xsd:string. The purpose of the association is to identify the elements and simple types as belonging to the vocabulary of the Xschema language.

Complex types are defined using the complexType element and such definitions typically contain a set of element declarations, element references, and attribute declarations. Any element appearing in an instance whose type is declared to be USAddress (e.g. shipTo inpo.xml) must have five elements and one attribute. These elements are called name, street, city, state and zip as specified by the values of the declarations' name attributes, and the elements appear in the same sequence (order) in which they are declared. The first four of these elements will each contain a string, and the fifth will contain a number. The element whose type is declared to be USAddress may appear with an attribute called country which contains the string US.

In defining PurchaseOrderType, two of the element declarations, for shipTo and billTo, associate different element names with the same complex type, namely USAddress. The consequence of this definition is that any element appearing in an instance document such as po.xml whose type is declared to be PurchaseOrderType must consist of elements named shipTo and billTo, each containing the five subelements (name, street, city, state and zip) that were declared as part of USAddress. The shipTo and billTo elements may also carry the country attribute that was declared as part of USAddress.

Figure 8A:
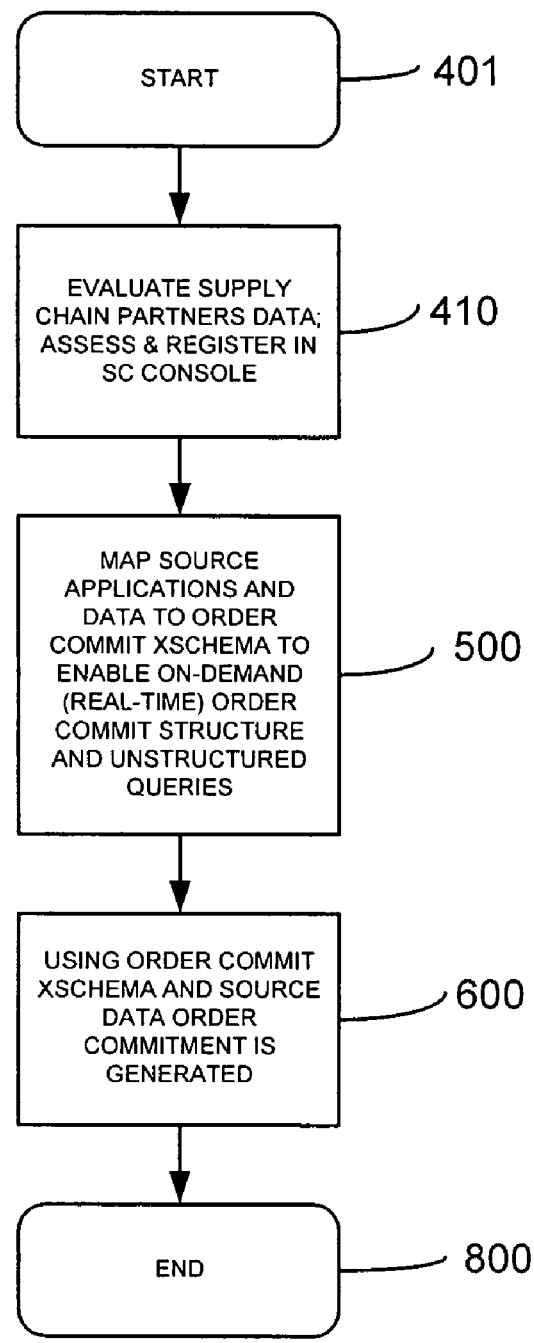
FIGS. 8A-8H illustrate algorithms and processes executed in the order commitment network of FIG. 4A.

FIGS. 8A-8H illustrate algorithms and processes executed in the order commit network of FIG. 4A by the architecture 300 of FIG. 5. FIG. 8A is a flow chart illustrating an operation 400 of the order commit network of FIG. 4A. The operation 400 begins in block 401. In block 410, data from the external data sources 390 are collected, evaluated, and registered in the SC console 310. In block 500, the data collected in block 410 are mapped to the order commit Xschema to enable on-demand, real-time order commit structured and unstructured queries. In block 600, using the order commit Xschema, an order commitment is generated. The operation 400 then ends, block 800.

Figure 8B:
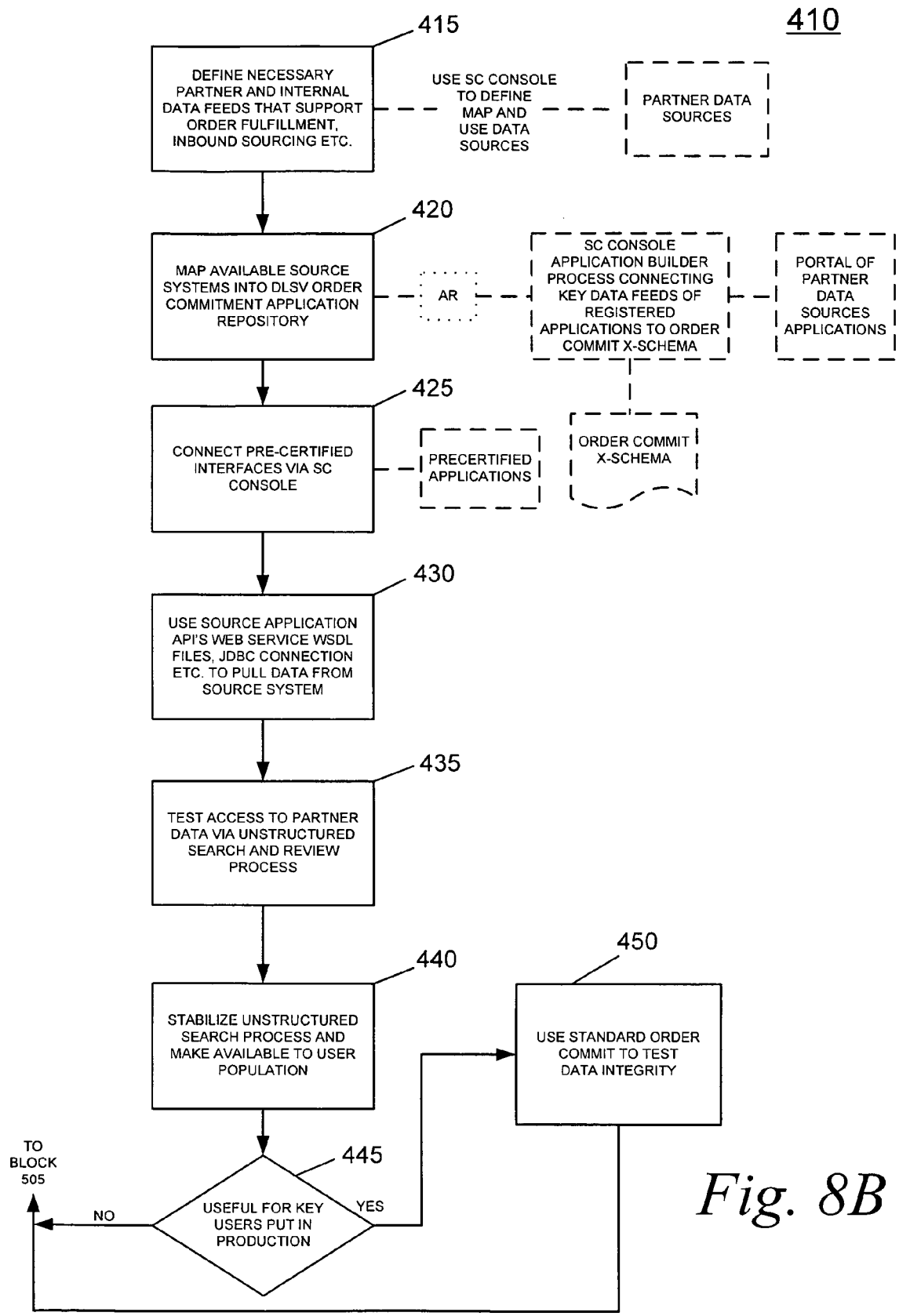

FIG. 8B is a detailed flow chart of the routine 410, collect, evaluate, and register data in the SC console 310. The routine 410 begins with block 415, define necessary partner and internal data feed to support the order fulfillment process. More specifically, the routine 410 may present default fields that will be implemented. However, a user may define specific data needs and fields to meet the user's needs for order commitment information flow. In block 420, the available external data source data are registered in the application repository 360. In block 425, any pre-certified data sources 390 are identified. The routine 410 then moves to block 430, and the architecture 300 uses the data source APIs, web service WSDL files, and JDBC connections, for example, to extract data from the external sources 390. Next, in block 435, access to data from the external sources is tested by executing an unstructured search of the external data sources 390. In block 440, the Xquery designer 311 stabilizes the unstructured search process, and makes the external data sources available to the user population through the user access module 380. In block 445, the query result is examined to determine if it is useful for key users. If the query result is useful, the routine 410 moves to block 450, and standard Xqueries of the data sources 390 is allowed. If the query result is not useable, the routine 410 moves to routine 500.

Figure 8C:
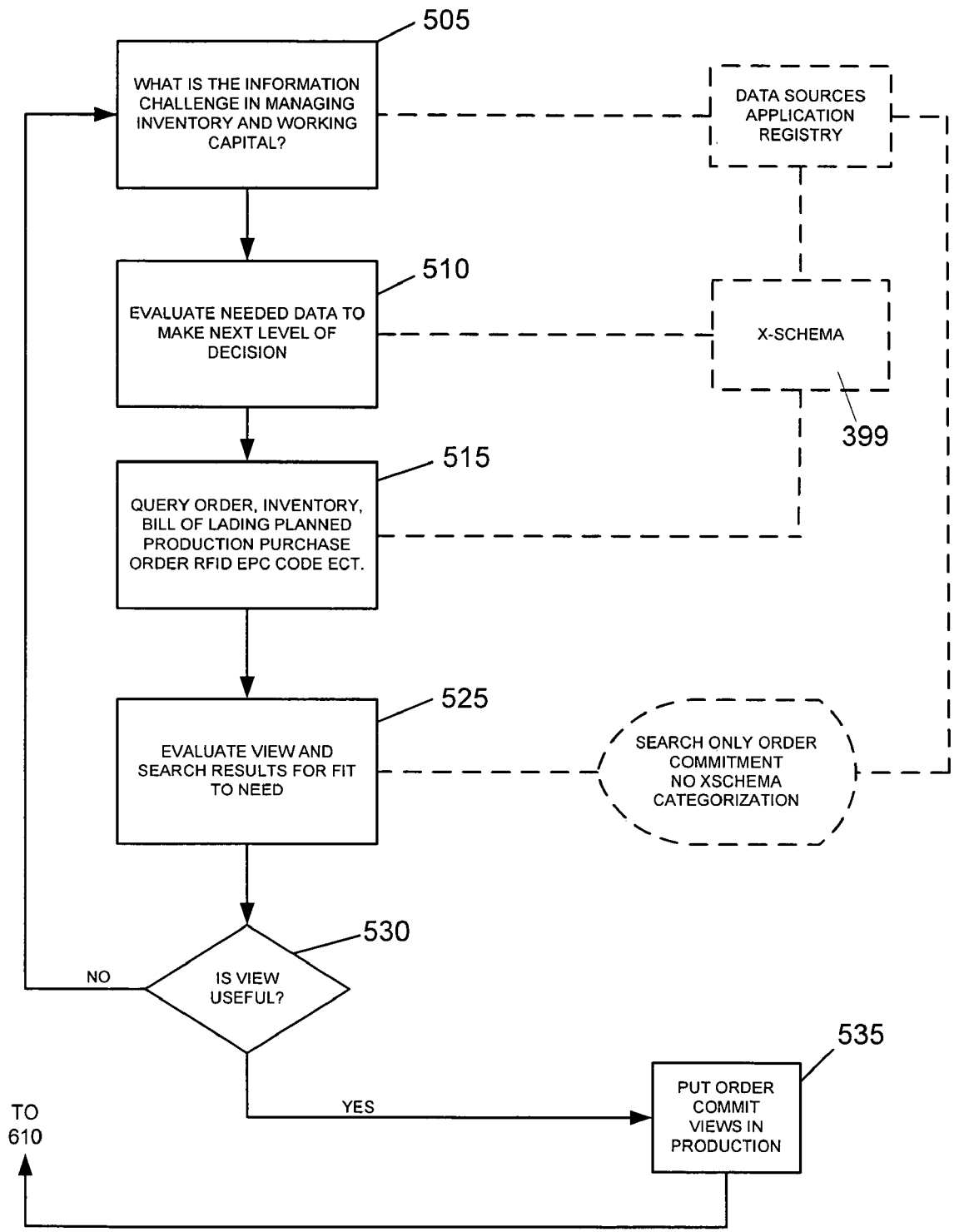

FIG. 8C is a flow chart illustrating routine 500 in detail. In block 505, an analysis of the supply chain network is completed to identify information challenges in managing inventory and working capital. More specifically, the members of the supply chain network provide feedback through the architecture 300 so that critical information can be identified for use in generating order commitments. In block 510, an order commitment real-time model is created and evaluated to show data relationships and how those relationships might affect decision-making among the network members. In block 515, a query of the model generated in block 510 is run and order commit tools are used to evaluate structured and unstructured views that may be produced from executing the model. The model is then evaluated, and if the model requires refinement, the routine returns to block 505 for further definition and evaluation of information needs. If, however, the model is satisfactory, the routine 500 moves to block 525, and the views and search results that are generated by the model are evaluated. In block 530, if the model views and search results fit the user's needs, the routine 500 moves to block 535, and standard Xqueries of the data sources 390 is allowed. In block 530, if the views and search results are not useable, the routine 500 returns to block 505 for further refinement of the information needs of the users. Following block 535, the routine 500 moves to routine 600 to increase the precision of the views.

Figure 8D:
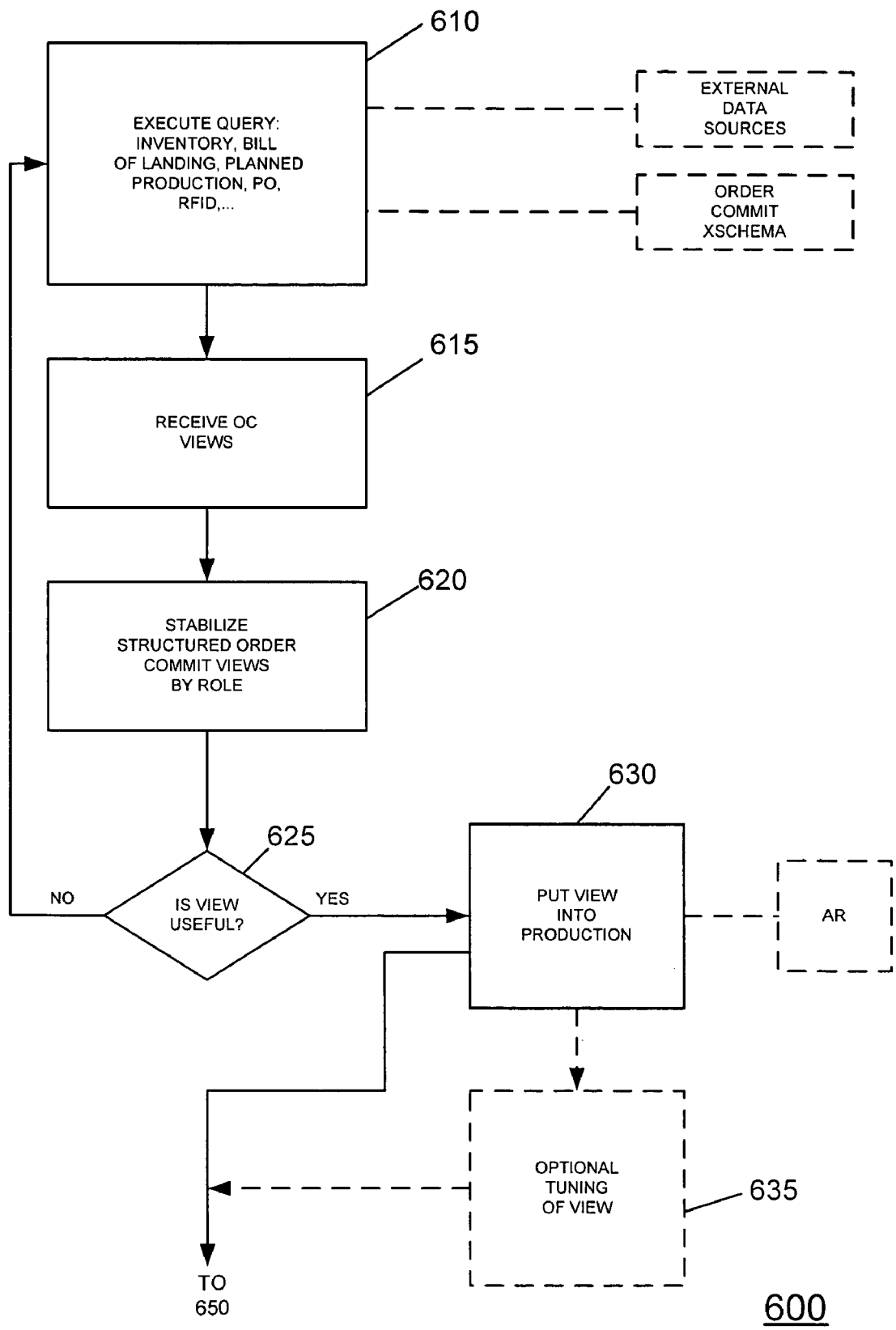

FIG. 8D is a flow chart illustrating routine 600, enable generation of high-precision order commitments. The goal of routine 600 is to use established partner network and working portions of the order commitment model to supply high volume questions for key order fulfillment roles. Through a process of executing queries and evaluating results, the accuracy and precision of order commitments generated using the architecture 300 may be refined and improved. The routine 600 begins with execution of a query (e.g., an Xquery related to an order, inventory, bill of lading, planned production, purchase order, and shipping status), block 610. The results, block 615, of the query of block 610 may be a number of views, such as a view of in transit purchase orders and shipments, a view of order placed by a customer along with the order status, and a view of total inventory exposure, for example. In block 620, the views received in block 615 are stabilized and evaluated. In block 625, if the views are useful to members of the network, the routine 600 moves to block 630 and the views are put into production. If the views are not useful, the routine 600 returns to block 610. Following block 630, the routine 600 may optionally move to block 635, and the views generated in block 610 may be tuned for better real-time data performance based on data from the external sources 390 and the Xschema. Following block 630 and optional block 635, the routine 600 moves to block 650.

Figure 8E:
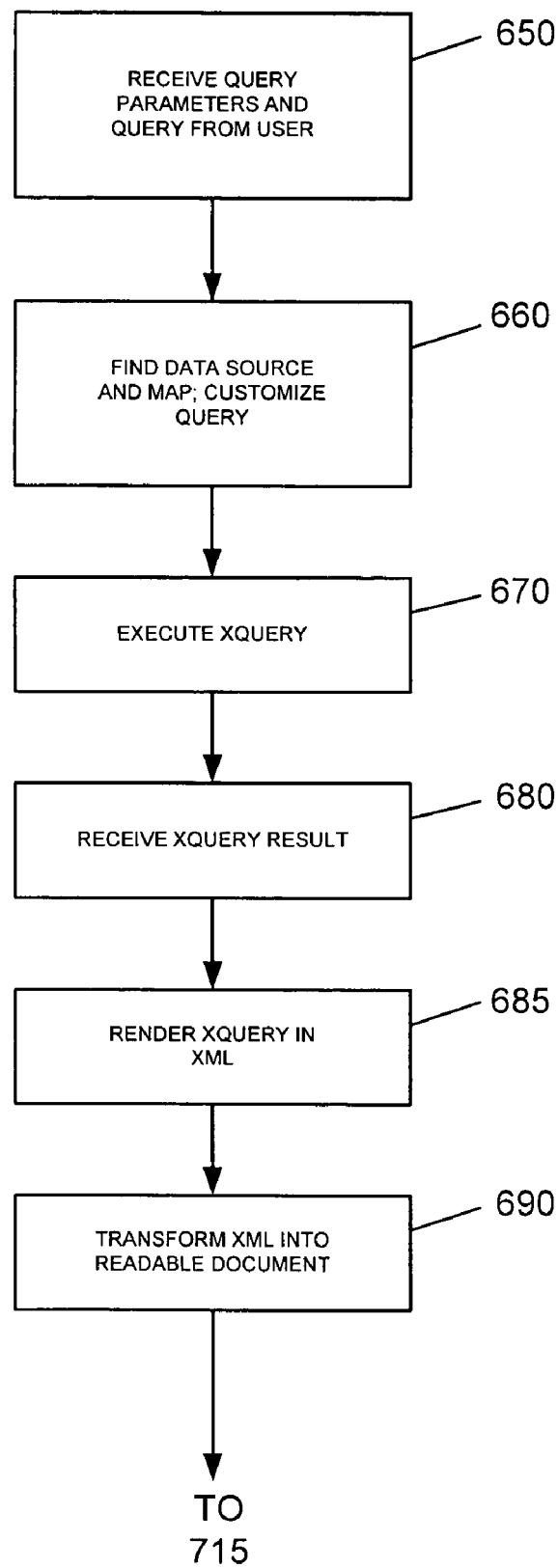

FIG. 8E is a flow chart illustrating a sub-routine for executing an Xquery. The sub-routine begins with block 650, when a user submits a query, including user-supplied query parameters. In block 660, the SC console 310 locates the relevant data sources, maps the data sources to the Xschema, and generates a customized query. In block 670, the Xquery run time engine (325, 335) executes the query. The result of execution of the query is one or more views that reflect the precision available from use of the Xschema. Examples of the views include structured order commitment by order processing, accounting risk management, and business role. To render the views in human readable form, the Xquery engine (325, 335) renders the result in XML, block 685, and in block 690, the XML result is transformed into a presentable document. The user then analyzes the result and relates the result to the user's specific business role. Next, the user makes a business decision based on the result analysis, and executes the decision. The sub-routine then moves to block 715.

Figure 8F:
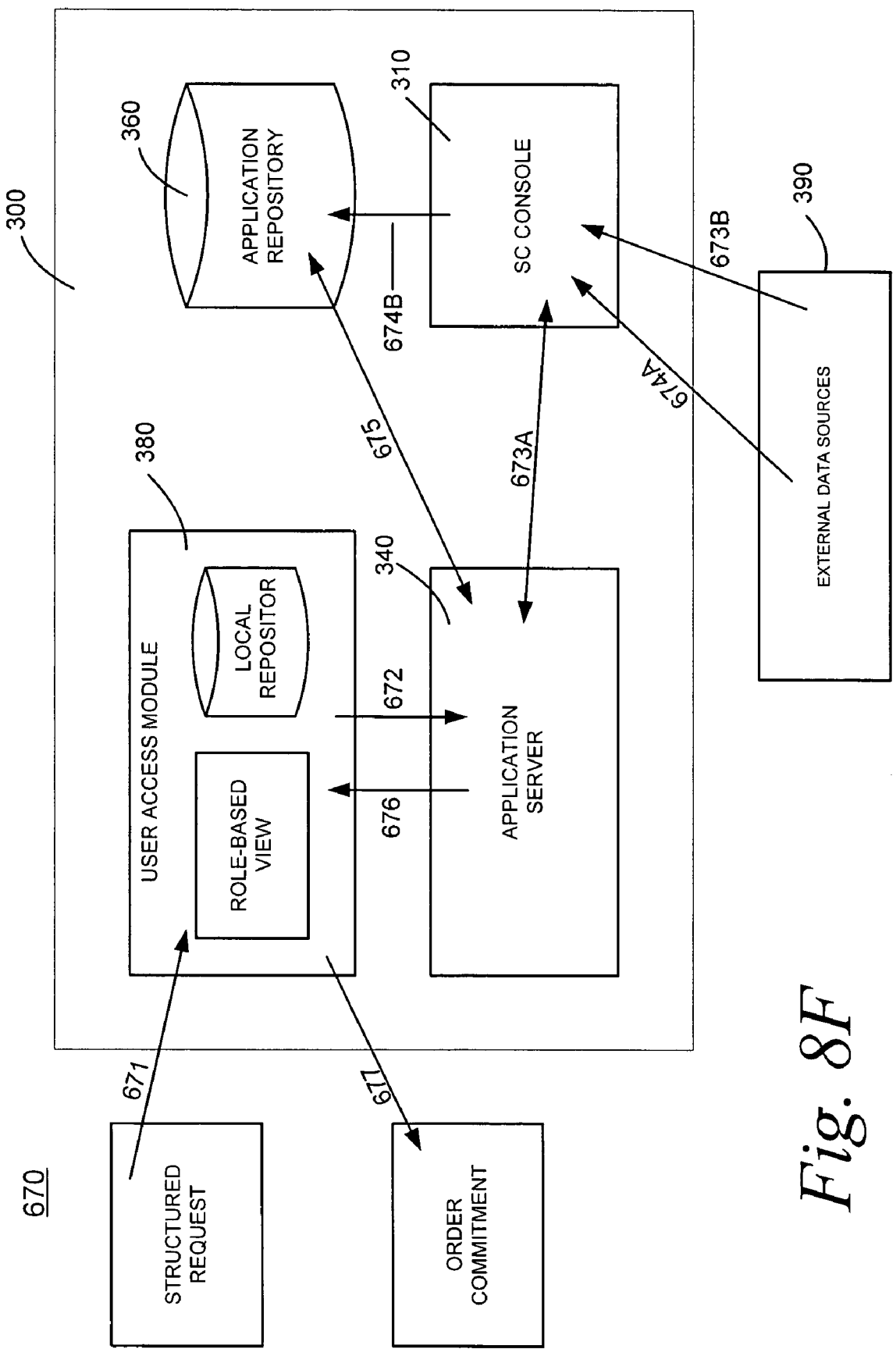

FIG. 8F is a chart illustrating steps involved in the execution of an Xquery (block 670) by the Xquery run time engine. In step 671, the user access module 380 receives the Xquery in the form of role-based structured request from a user of the order commit network. The user may be a human or a machine. In step 672, the request is sent to the application server 340 for processing into a format executable by the Xquery run time engine. The request is then passed to the Xquery run time engine in the SC Console 310, step 673A. The SC console 310 may interrogate the external data sources 390 to enable an Xquery design, step 673B. Alternatively, the request may match a predefined Xquery saved in the application repository 360, which is extracted form the repository 360 (step 674B) and sent to the application server 340 (step 675). The Xquery run time engine (325, 335) within the SC console 310 executes the desired Xquery, step 674A and the result is stored in the application repository and returned to the user as order commitment (steps 676, 677).

Figure 8G:
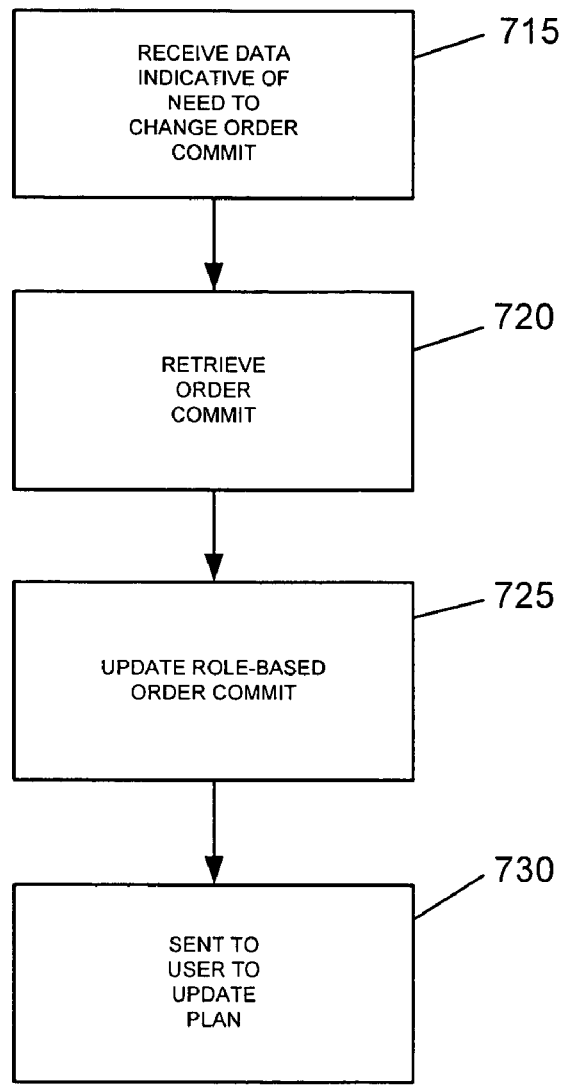

FIG. 8G illustrates a sub-routine 710 to handle a change in order commit data. In a supply-chain context, the provider of a role-based order commit may receive data that suggests the order commit should be revised. Alternatively, an outstanding order commit (i.e., an unfulfilled order) may be persisted in the supply chain network and may include features that allow monitoring of source data for any changes that would impact the order commitment. The architecture 300 therefore accommodates manual or automatic revision of order commitments as unplanned events occur, or as other assumptions related to the source data change. In block 715, a user in the order commit network receives data indicative of a need to change an order commitment. In block 720, the elements of the architecture 300 needed to revise the order commitment are retrieved from the application repository 360 or the local user repository 384. In block 725, the user, with the aid of tools provided with the architecture 300, updates retrieved elements so as to implement a change to the order commitment. In block 730, the revised order commitment is sent to a user of the order commitment. The order commitment user may then update any affected planning documents, such as the S&OP, for example.

Figure 8H:
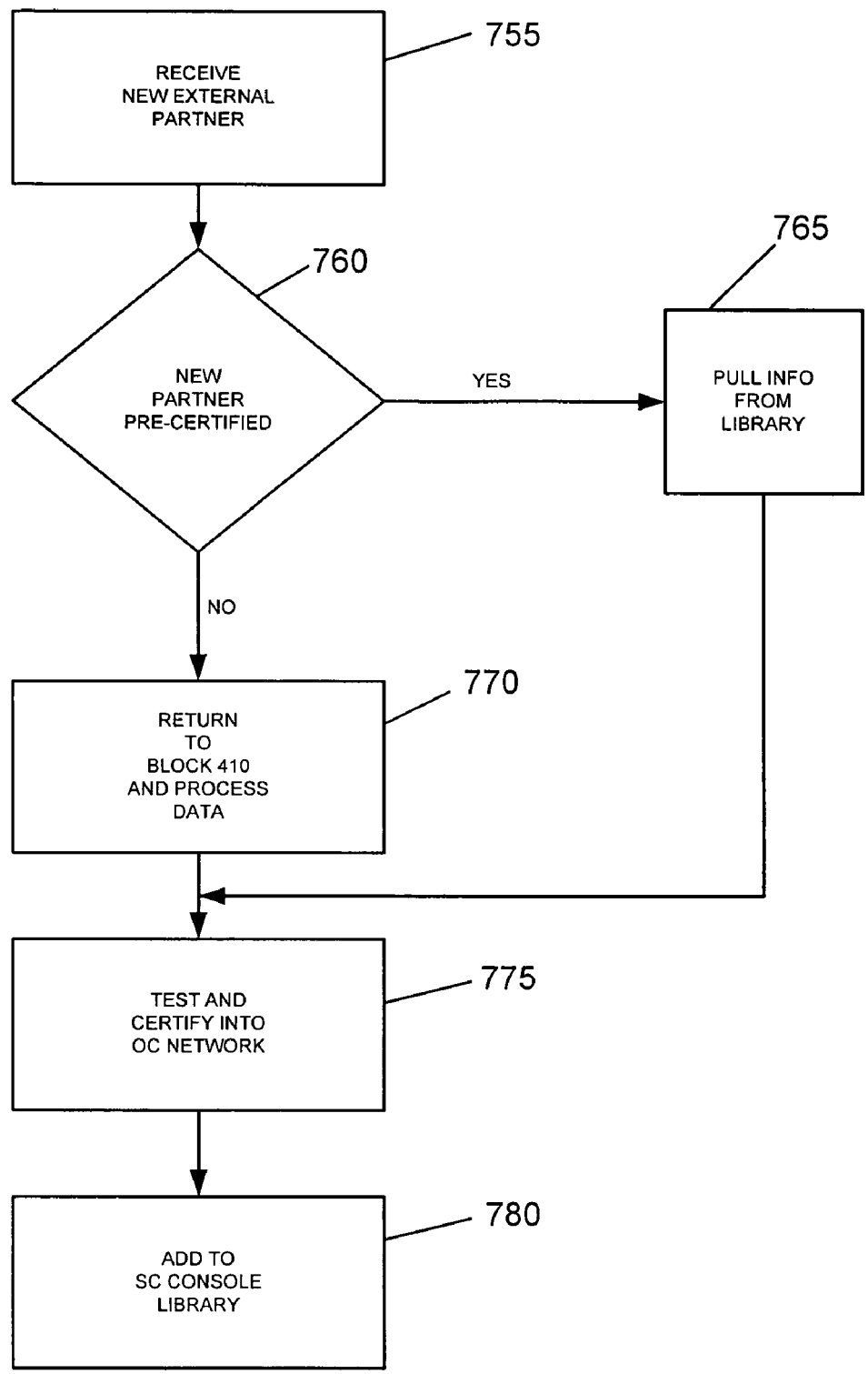

FIG. 8H illustrates a sub-routine 750 to add a new external partner to the order commit network. In block 755, the architecture 300 receives an indication that a new external partner has been added to the order commitment network. In block 760, the architecture 300 determines if the new external partner is pre-certified. If yes, the sub-routine 750 moves to block 765, and information related to the new external partner is pulled from a library or registry of pre-certified external partners. Then, the sub-routine 750 moves to block 775. In block 760, if the new external partner is not pre-certified, the sub-routine 750 moves to block 770. In block 770, the subroutine 750 ends, and processing returns to block 410 (see FIG. 8B). In block 775, the new external partner is tested and certified into the order commitment network, and is registered in the application registry. In block 780, the external partner's data is included in the SC console.

Figure 9A:
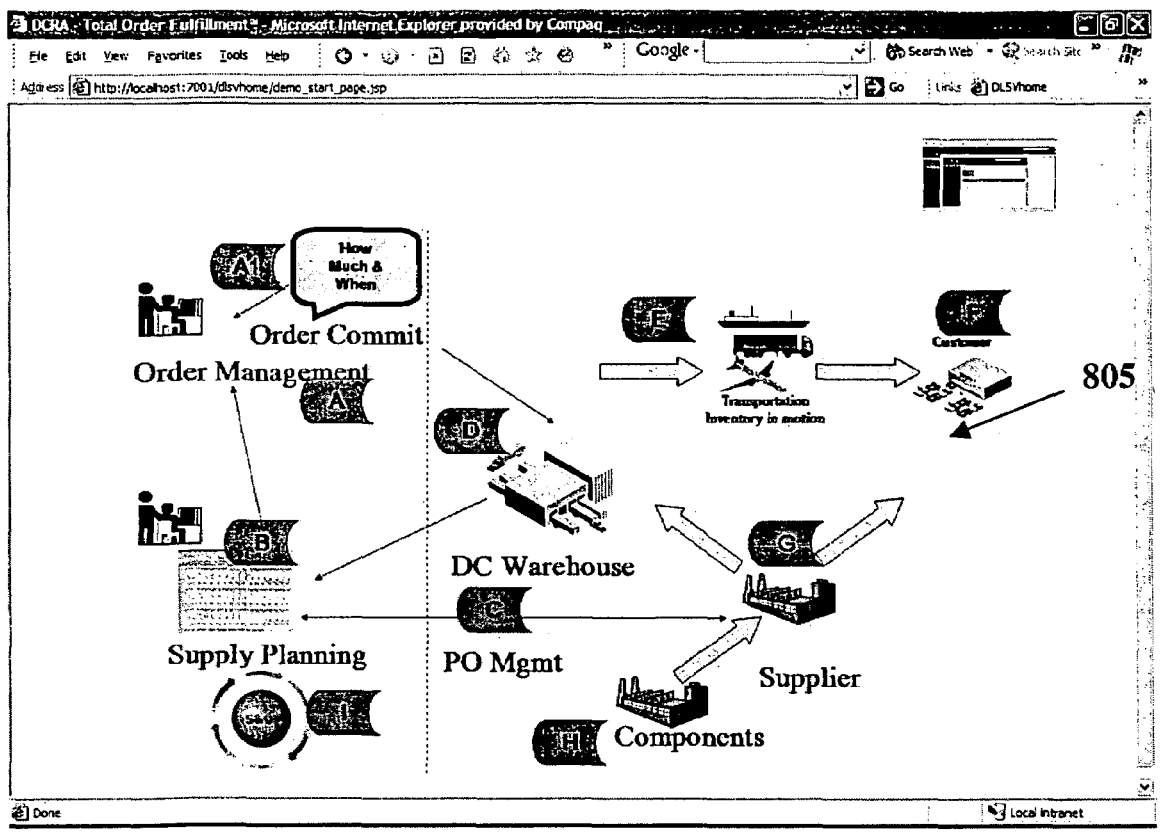
FIG. 9A illustrates the order commit network of FIG. 4A as an active tool in the architecture of FIG. 5.

As noted above, the user access module 380 (see FIG. 5) contains the necessary routines and devices to generate human (graphical) user interfaces and machine-to-machine interfaces and to receive inputs from users (human and machine). FIGS. 9A-9N show various interfaces and views associated with the order commitment system and method. The interfaces and views are shown as elements of graphical user interfaces (GUIs). However, the same information presented in the GUIs could also be presented in other electronic formats, such as text documents, and may be transmitted in hard copy, by facsimile, and other means. The views help various supply chain decision-makers commit a date on any order. Different views may be desired by different decision-makers, depending on their role. For example, planners may require an order commitment view and a salesman may require a customer demand view. The views then are the interfaces to the decision-maker. When the user is another machine (e.g., a computer) the views are data inputs to the computer, and may be in any form compatible with the computer.

FIG. 9A illustrates the order commit network 100 of FIG. 4A as an active tool 805 in the architecture 300. Specifically, each of the flags A-I shown in FIG. 9A is a link (e.g., a hyperlink) to data sources such as the data sources 390 using an Xschema-derived map to relate data into a format desired by the user or designed to satisfy a pre-defined role.

Figure 9B:
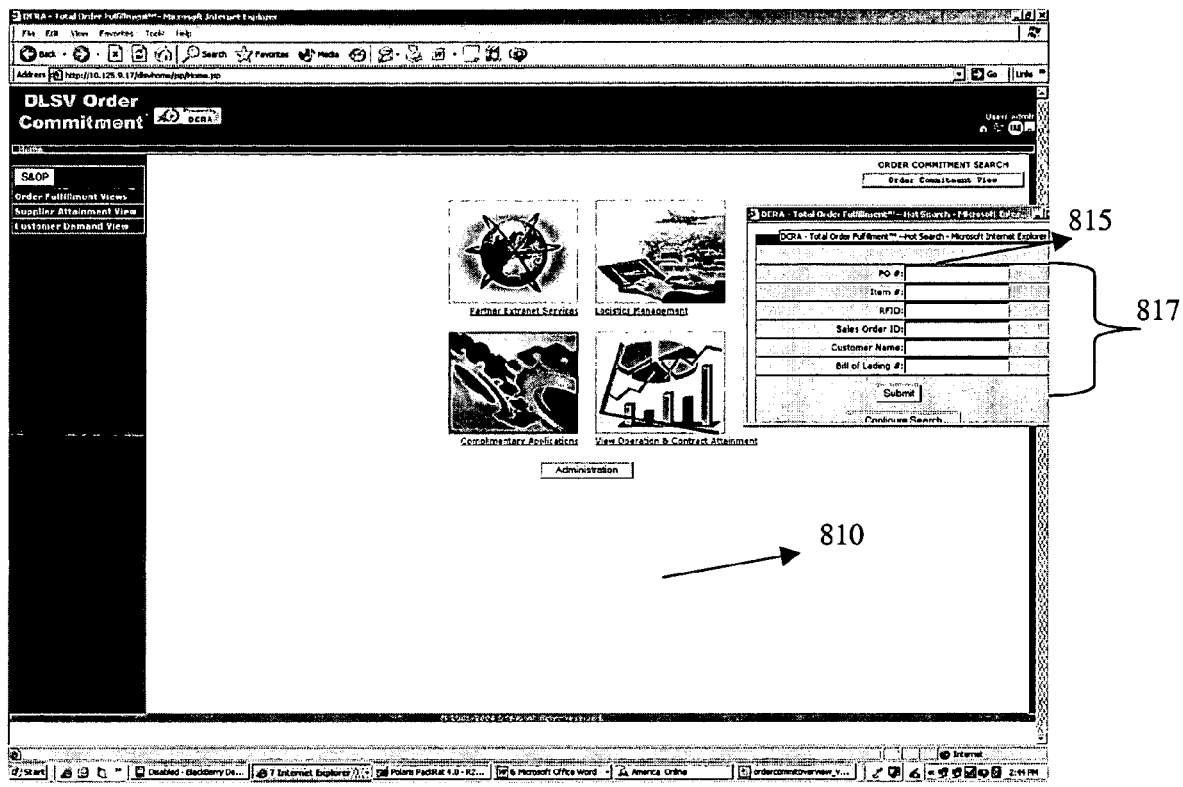
FIG. 9B illustrates an unstructured order commit search view request.

FIG. 9B illustrates an unstructured order commit search views request 810. The view request 810 corresponds to the unstructured order commit search view 383 shown in the architecture 300 of FIG. 5. The view request 810 includes pop-up dialog box 815 that reduces data required to begin an unstructured search to only one field, or a part of a field. That is, as long as at least part of one of fields 817 shown in the dialog box 815 is completed, the Xquery run time engines 325/335 can execute an Xquery. In fact, the dialog box 815 includes only six fields 817. In the supply chain network 100, the six fields illustrated should allow access to the vast majority (i.e., greater than 95 percent) of all relevant supply chain data. Once the Xquery results are presented to the user, the user can "drill down" to obtain a more refined and complete view of the information form the data sources 390. The more data is completed in the dialog box 815, the more precise the initial search will be. Moreover, using the SDK 350 of the architecture 300 of FIG. 5, the dialog box 815 can be configured to display any type or nature of field, and each field 817 can be configured to limit the data inputs, such as by specifying a field length or arrange, or adding a pull-down menu, for example.

Figure 9C:
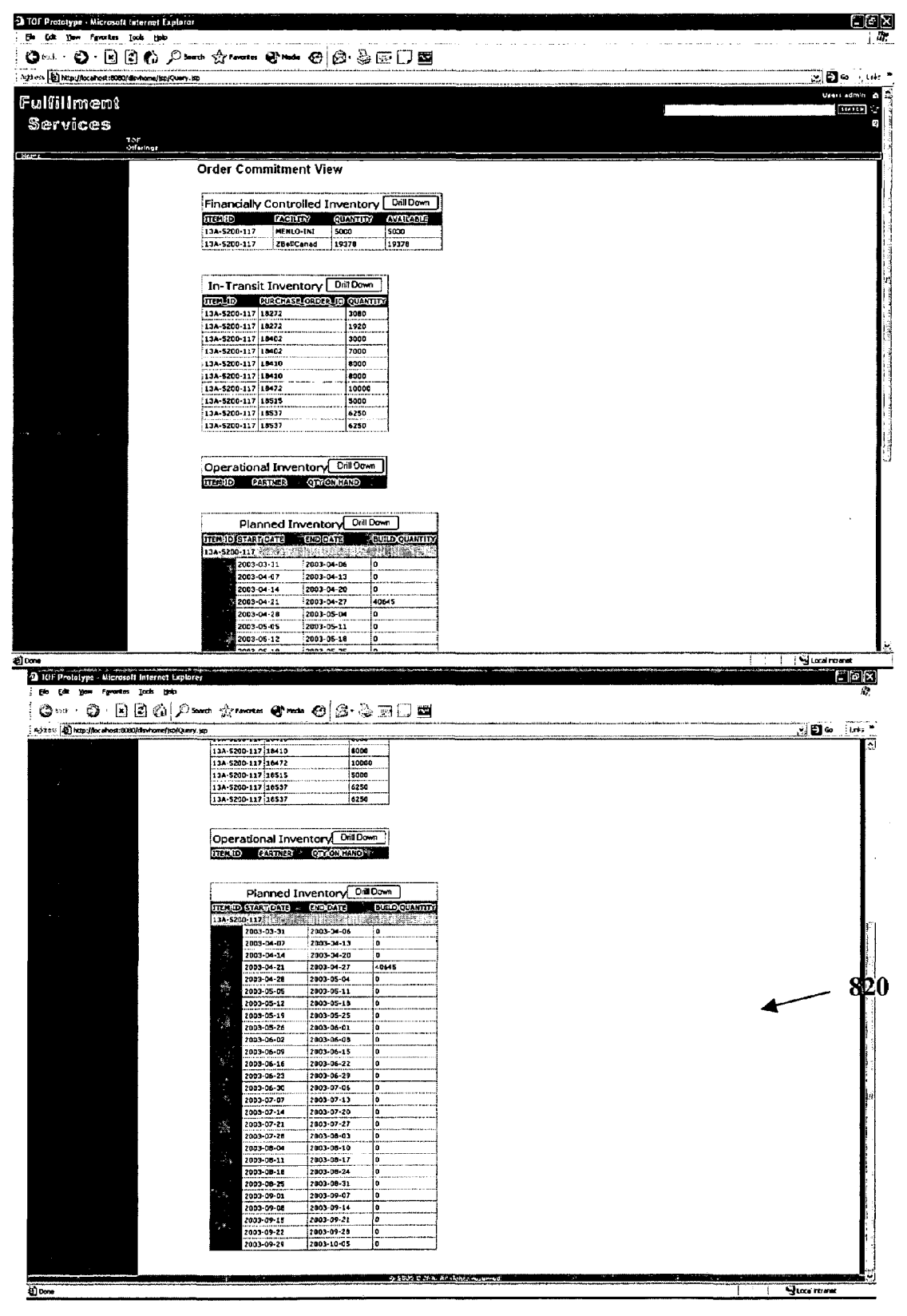

FIG. 9C illustrates an unstructured order commit search view result 820. The unstructured search may have used as an entry point, all or a fragment of item_id (in the example shown, 13A-5200-117). The view result 820 includes sub-views for various parameters related to order commitment. As shown, the sub-views include financially-controlled inventory, in-transit inventory, and planned inventory. By scrolling on the view, other sub-views retrieved by the unstructured Xquery will be revealed. Thus, a user is able, using only a small amount of information, to receive a significant amount of relevant data to help the user in the decision-making process. One feature of the displayed subviews is a "drill-down" button that allows the user to locate more detail related to a specific order commit parameter.

Figure 9D:
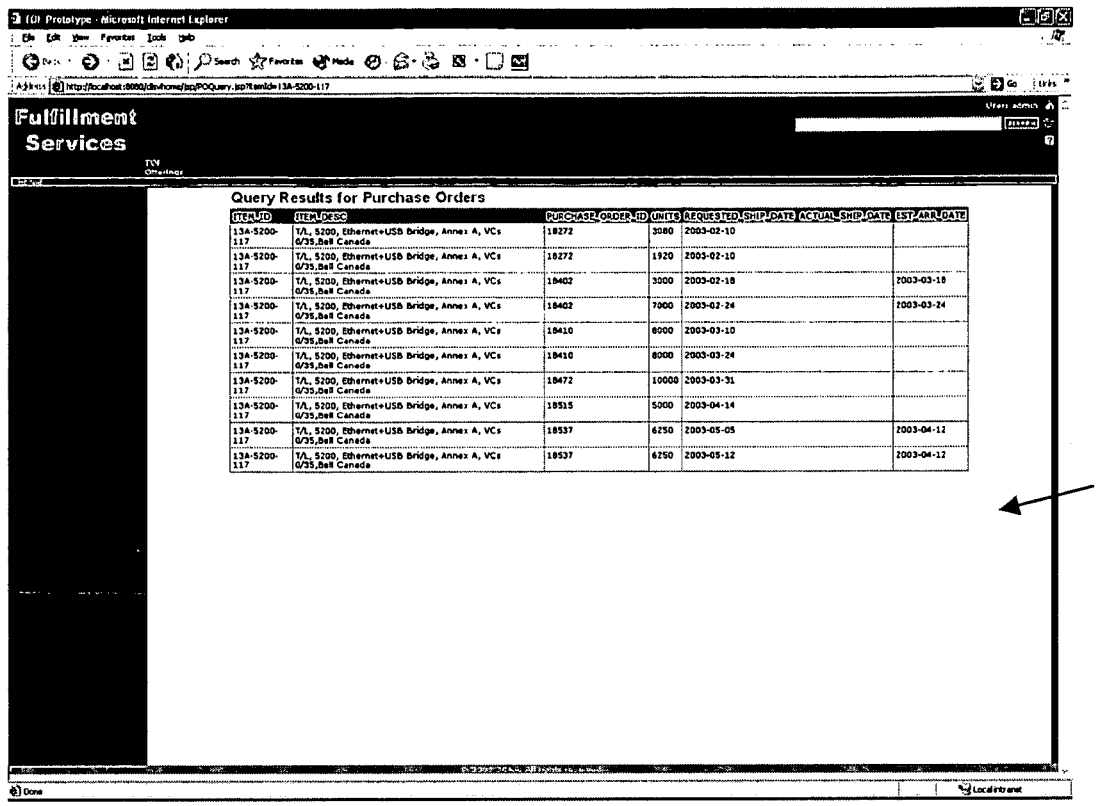
FIG. 9D illustrates an exemplary "drill-down" view of data.

FIG. 9D illustrates an example of a "drill-down" view 830 of data based on purchase orders displayed on the view result 820 of FIG. 9C. In particular, a drill-down of the in-transit inventory subview shows details related to purchase orders for each of the separate in-transit inventory items.

Figure 9E:
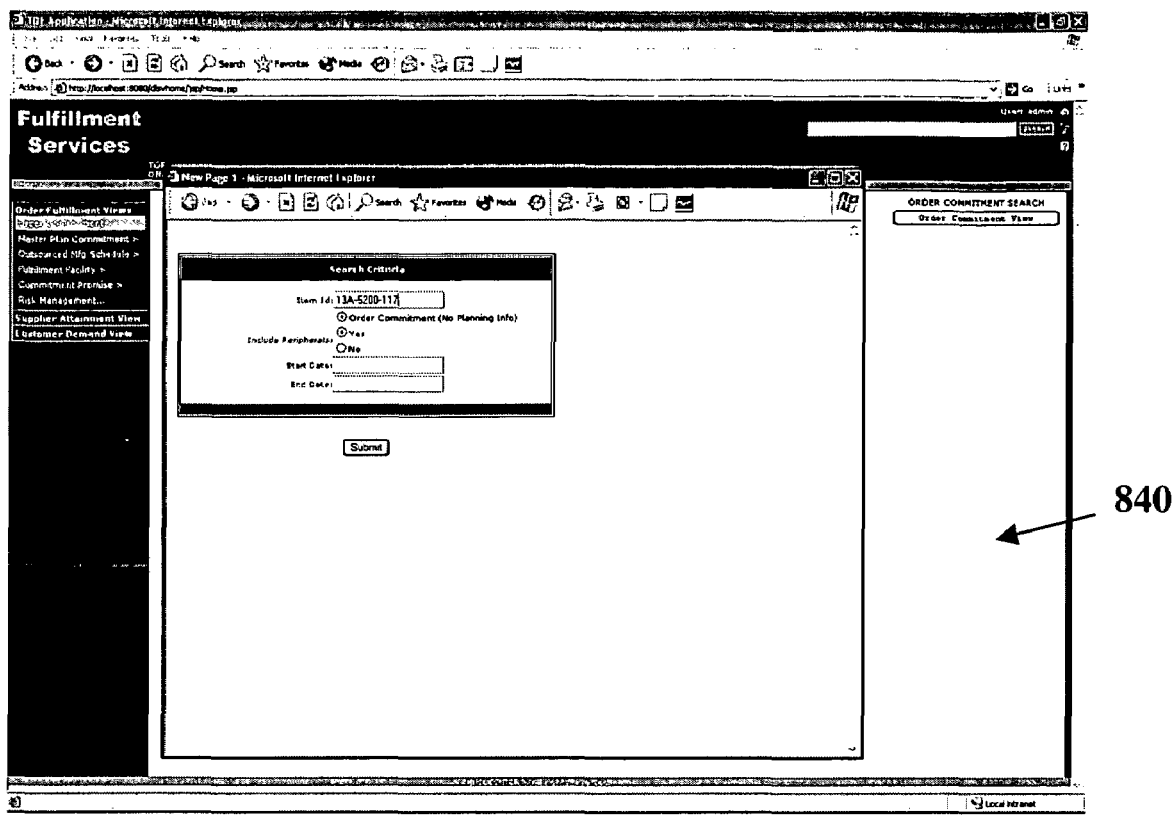
FIG. 9E illustrates a structured query request.
Figure 9F:
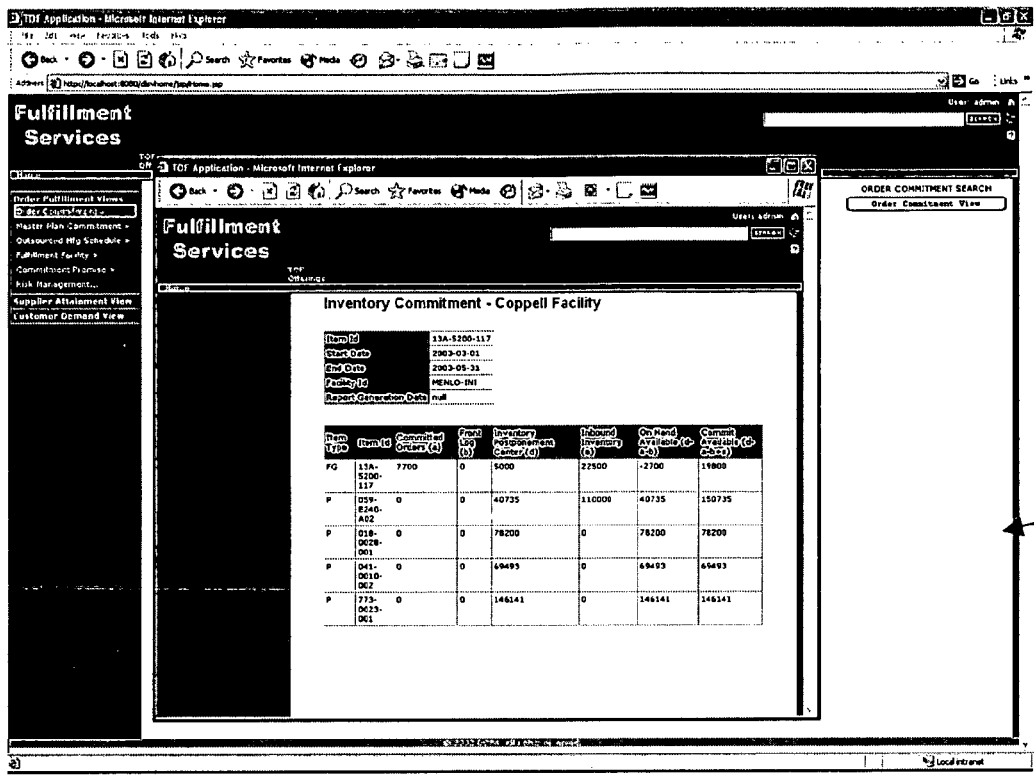
FIG. 9F illustrates an order promising result corresponding to the request of FIG. 9E.

FIG. 9E illustrates a structured query request 840 and FIG. 9F illustrates a corresponding order promising result 850 based on available inventory. In FIG. 9E, a dialog box allows a user to enter specific information for the structured Xquery. As shown, the user may enter data into item-id, start date and end date fields, and then submit the Xquery using submit button. The Xquery may exist in the application repository 360, and the entry of data into the fields is used by the Xquery run time engines 325/335 to limit the scope of the structured Xquery.

In FIG. 9F, the returned result 850 shows the data entered to start the structured Xquery and the results of the Xquery in tabular form. The results are shown for a structured inventory search for a few SKUs and a drilldown of each SKU. The order commitment architecture 300 provides for an implementation definable menu structure for pre-defined roles in the supply chain. The base device provided to commercial users provides a range of pre-defined simple search queries, unstructured order commitments, and structured order commitments that specifically relate to supply chain order commitment roles. For example, one view shows the explosion of all inventory by core component via a bill of materials and shows available inventory in a warehouse plus inbound inventory with customer promise lead times. Another view automatically and adaptively synchronizes with a S&OP master plan and compares the currently reported execution status to the plan, thereby allowing a master planner to save significant time in re-planning. Still another view provides customer service users and order entry roles so that a user can see a customized view ranging from a simple Yes-fill to No-backorder status to a more complex data explosion that supports an order manager's decision-making process by allowing the manager to see and understand roll-up data and to obtain confidence that key external partners' capabilities will be available to meet the customers' order commitments. Yet another view allows a CFO to automatically reconcile balance sheets or sales records to a master S&OP plan to see if the plan and execution of the plan correspond to budget and established risk factors. The order commitment architecture 300 provides these role based view pre-mapped to the Xquery data source. In general, these views are more precise decision support views of the supply chain data for specific decisions based on job role.

Figure 9G:
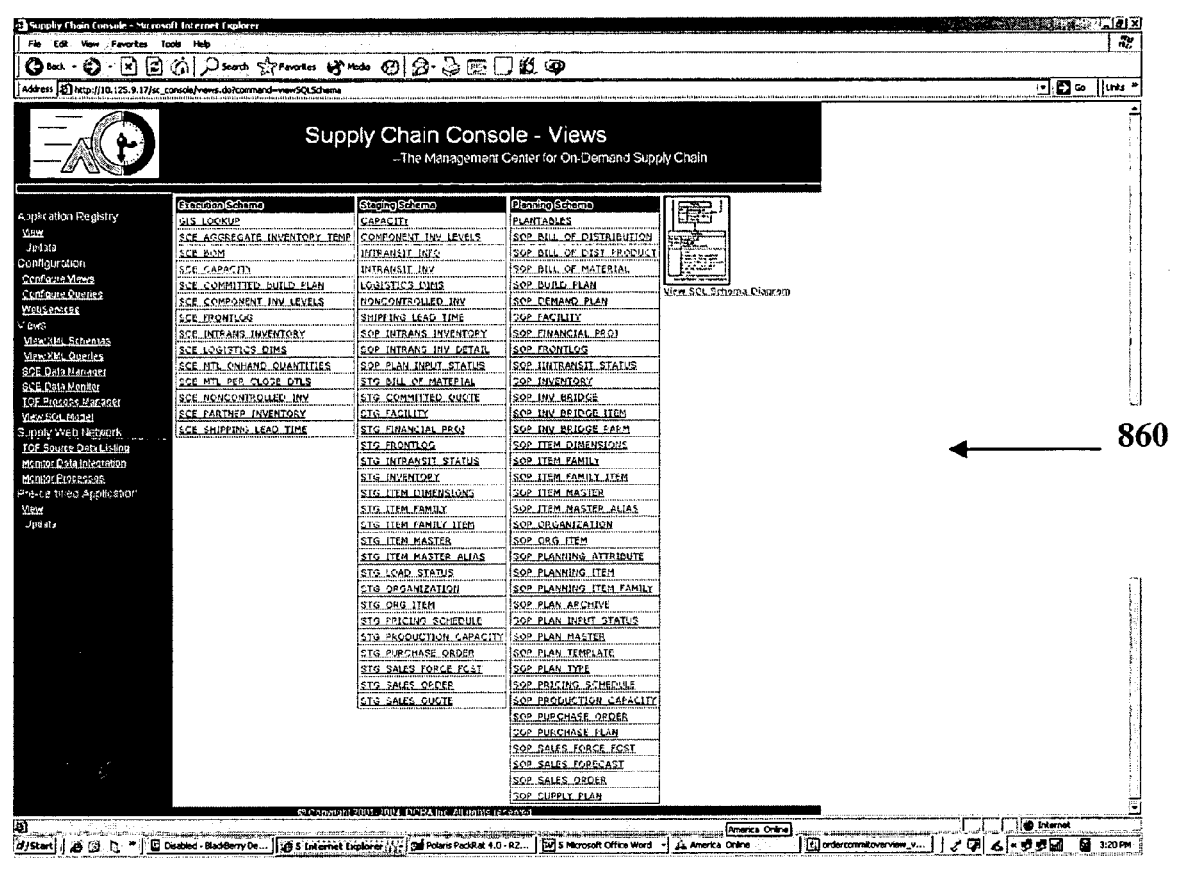

FIG. 9G illustrates views available from the SC console 310. The specific views may be persited in the application repository 360. The specific views may also be adjusted using the SDK 350 and other tools and elements of the architecture 300.

Figure 9H:
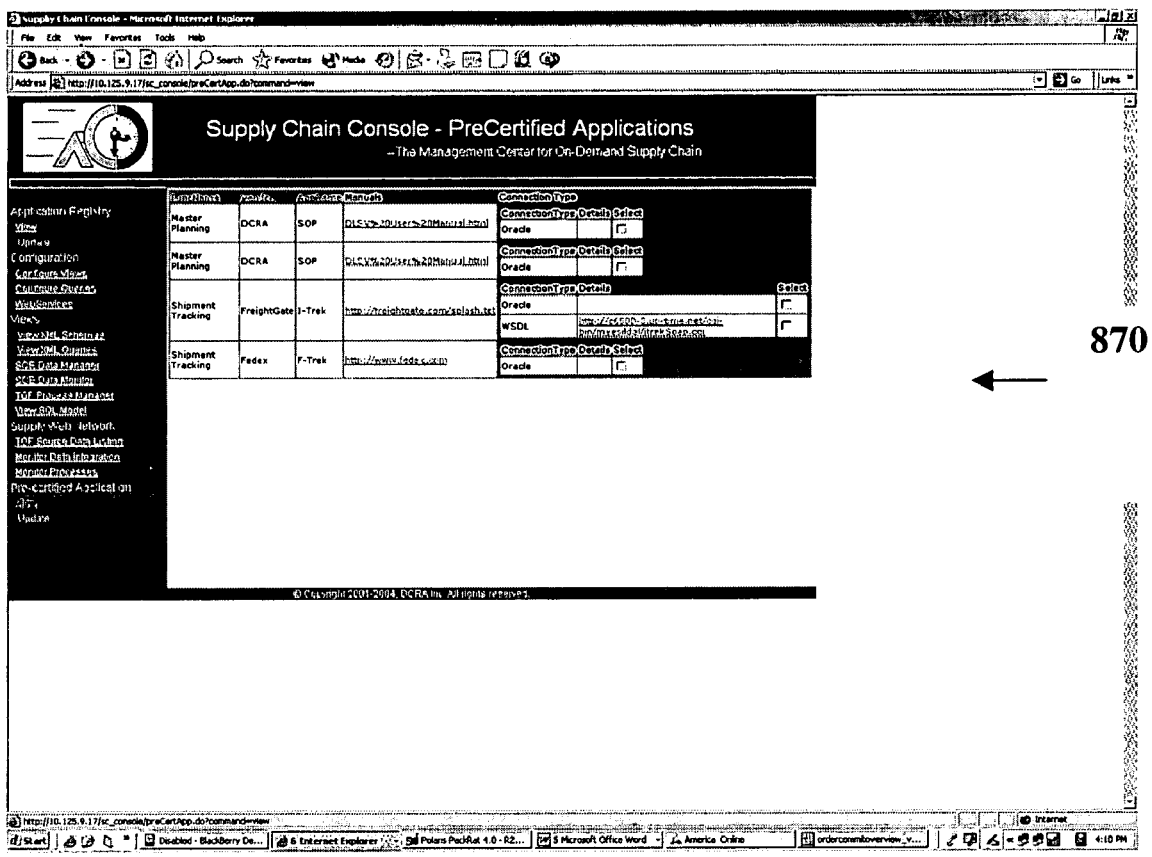
FIG. 9H illustrates a registry of pre-mapped and pre-certified web service applications.

FIG. 9H illustrates a registry 870 of pre-mapped and pre-certified web service applications. Pre-certified applications are presumptively mapped to the order commit Xschema, and the initial mapping performed by the SC console 310 is not required for pre-certified applications listed in the registry 870.

Figure 9I:
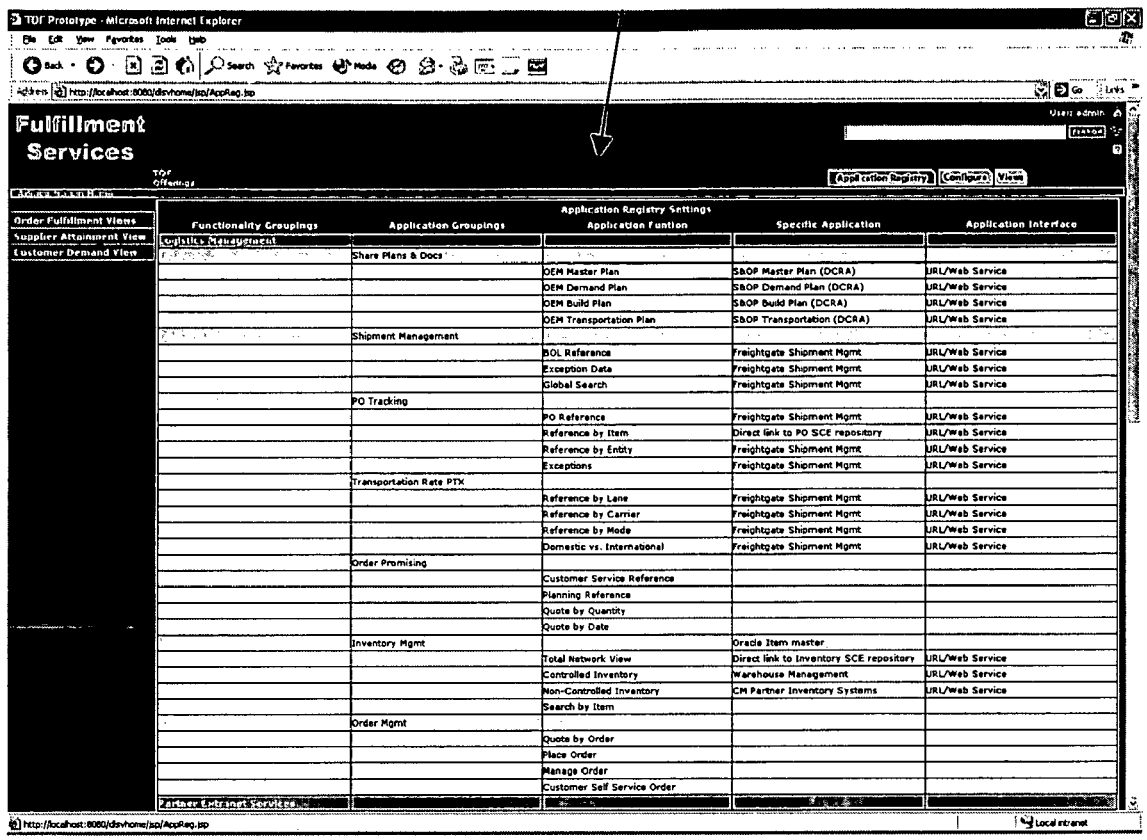
FIG. 9I illustrates an exemplary application registry.

FIG. 9I illustrates an exemplary application registry 880. Information from the application registry 880 is used to determine portal settings for applications in the order commit network.

Figure 9J:
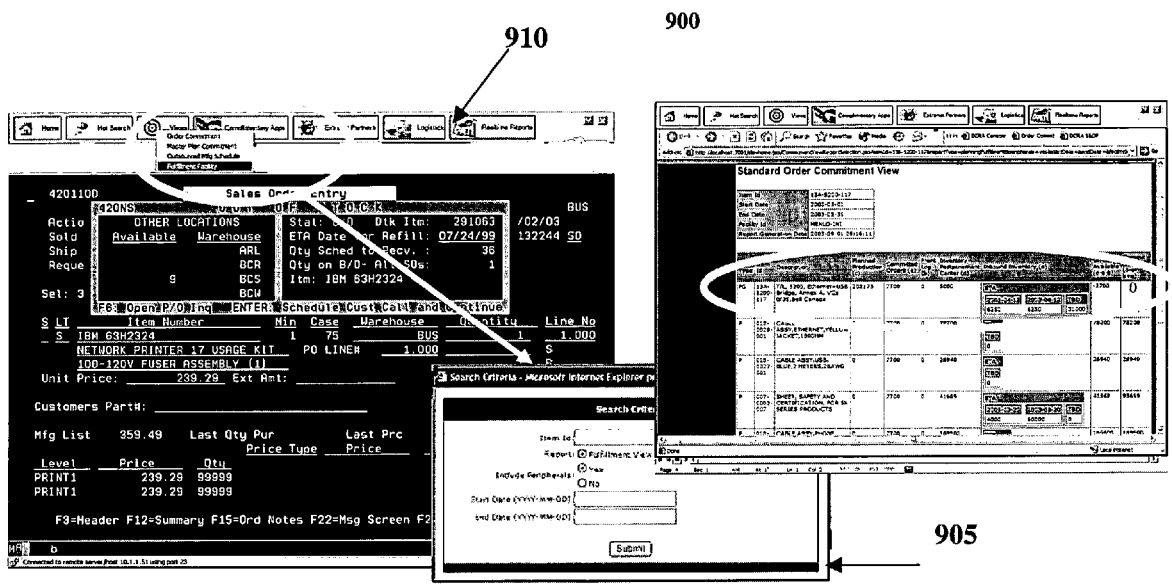
FIG. 9J illustrates an order commit icon pallet.

FIG. 9J illustrates an order commit icon pallet 900 that can overlay any web application or non-web application and provide the order commit functionality as a non-intrusive overlay. In FIG. 9J, the icon pallet 900 is shown overlaying a browser 905 that accesses a mainframe application. The icon pallet 900 includes a simple tool bar pallet 910 that executes the order commit functions. The icon pallet 900 can be configured by a user using the SDK 350 of the architecture 300 of FIG. 5.

Figure 9K:
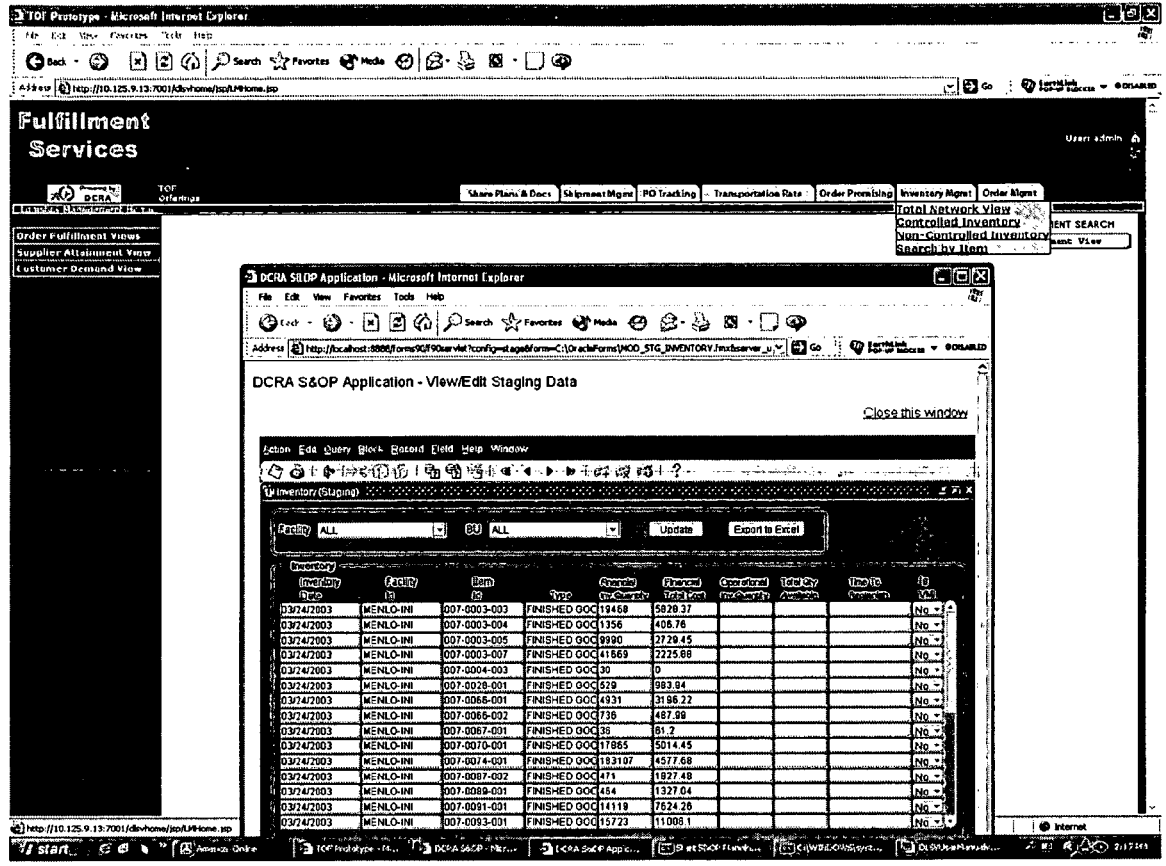
FIG. 9K illustrates an exemplary network inventory view.

FIG. 9K illustrates an exemplary network inventory data source 920 that provides inputs to the order commit architecture 300.

Figure 9L:
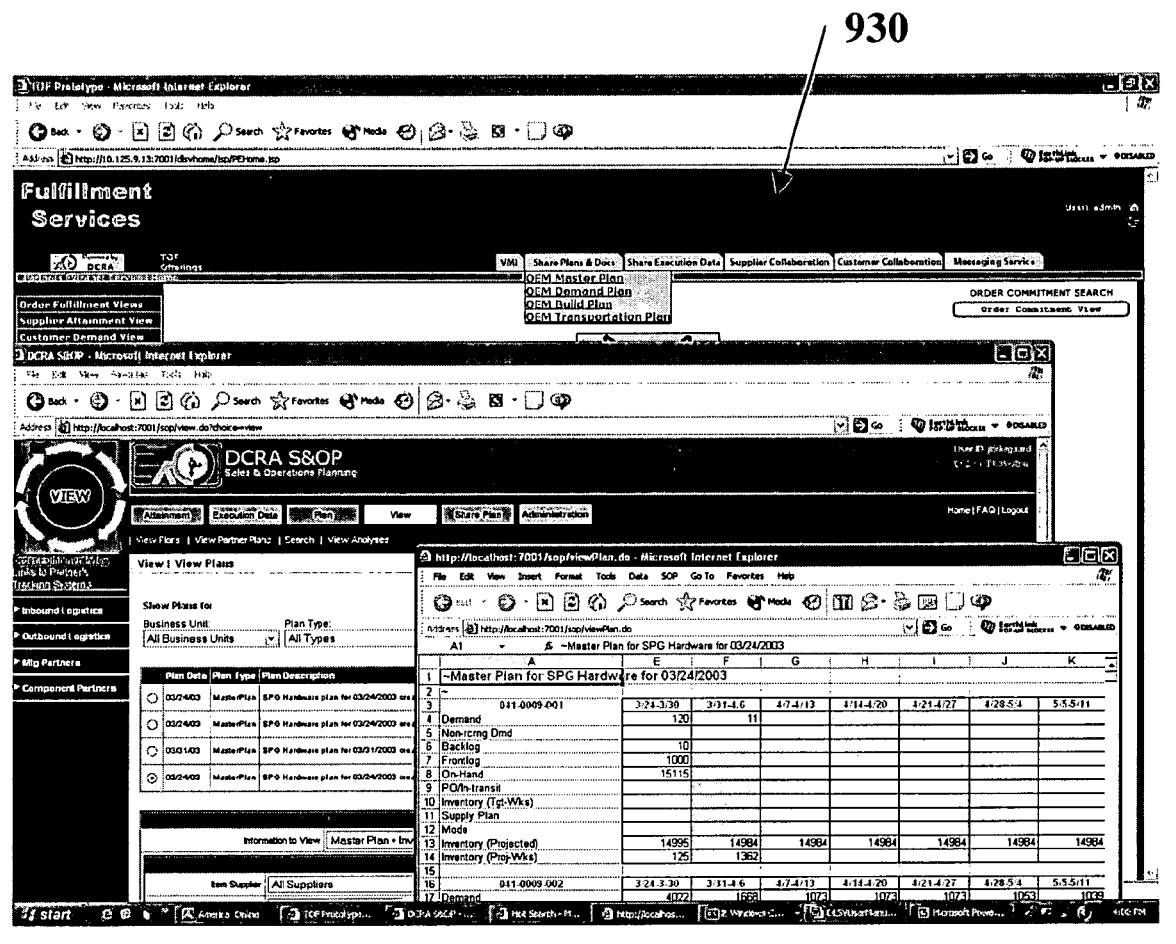

FIG. 9L illustrates an exemplary view 930 of a mapping to a typical master planning production data source. Using the architecture 300 of FIG. 5, the user can navigate applications through a web service and other applications created using the application registry and the SC Console mapping means.

Figure 9M:
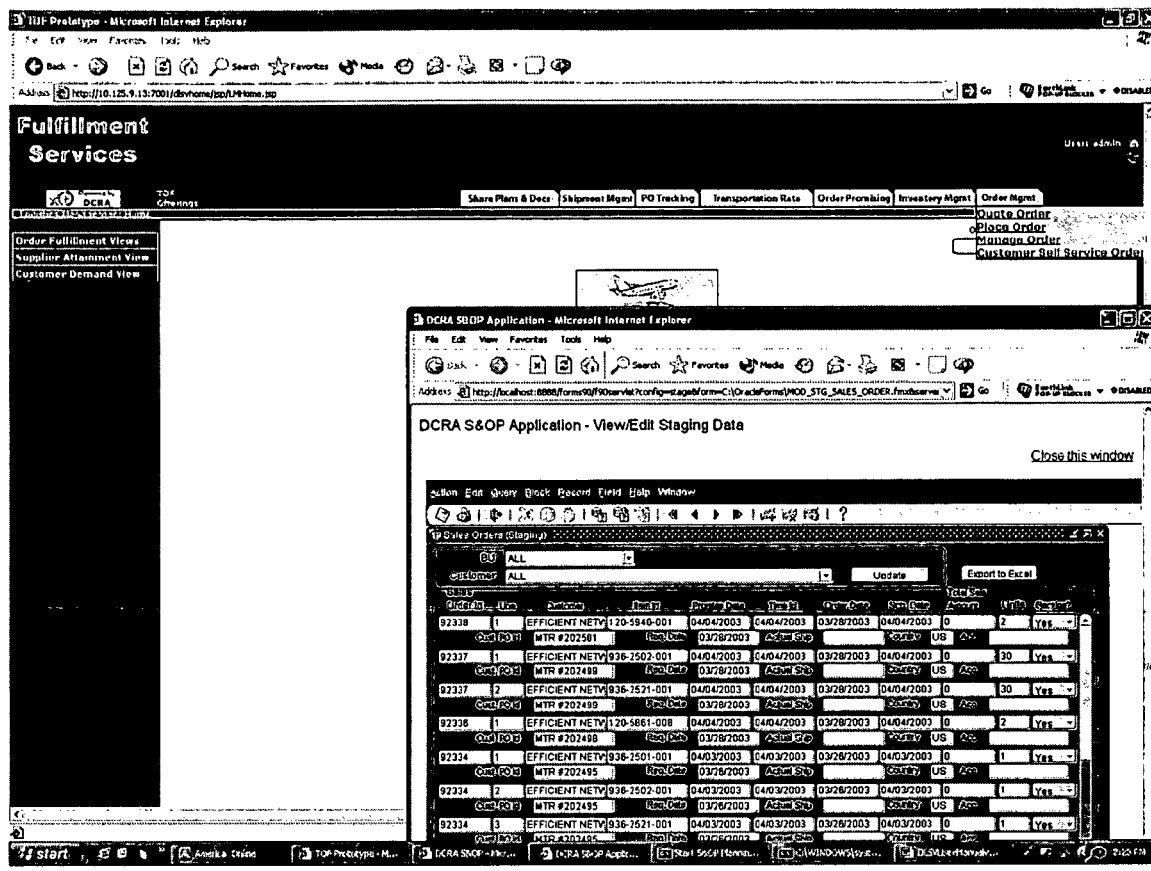
FIG. 9M illustrates an exemplary view of portal linkages to one or more of the concurrent external data sources of FIG. 5.
Figure 9N:
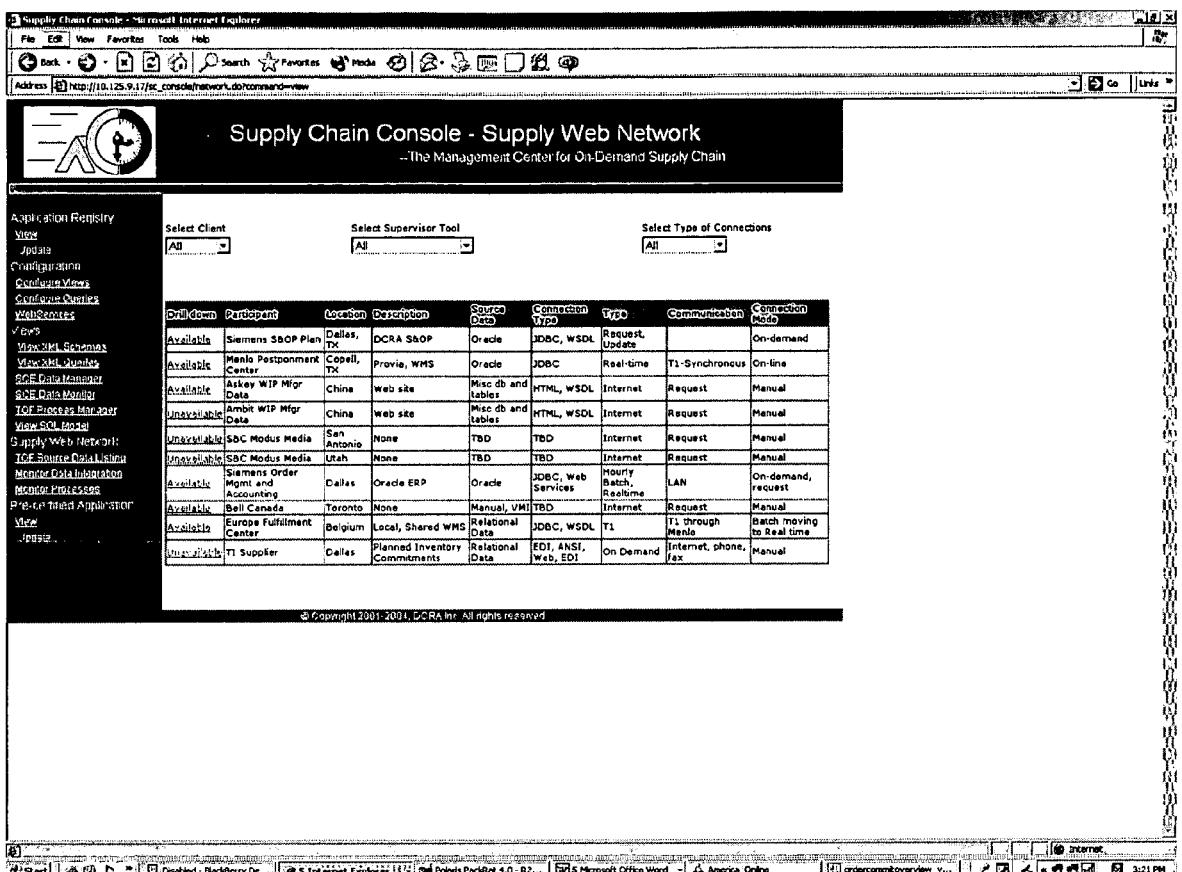
FIG. 9N illustrates order commitment network partners with associated available data types.

FIG. 9M illustrates an exemplary view 940 of portal linkages to one or more of the concurrent external data sources 390 of FIG. 5. Within the architecture 300, the flow of information over the linkages is illustrated in committable support views, such as the view 940. The view 940 may update in real time as data from the concurrent external data sources 390 changes.

FIG. 9N is a list of order commitment business partners. The list indicates the types and source of data from the partners, requirements for updating (e.g., periodically) and when order commitment request are made (e.g., on-demand, batch). The list also indicates when additional information details are possible through use of a "drill down" feature.

Figure 10:
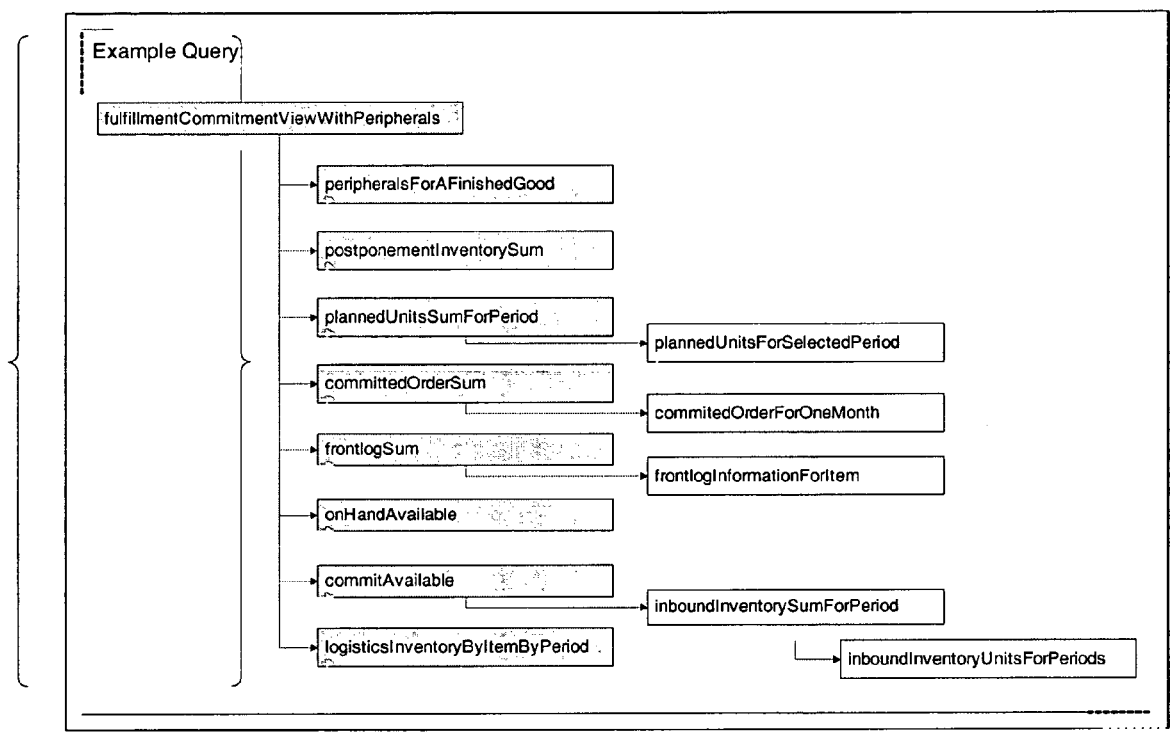
FIG. 10 illustrate an exemplary Xquery.

FIG. 10 is an exemplary Xquery 950. The Xquery 950 may be persisted in the application repository 360. The Xquery 950 includes various views with the option to select additional sub-views.

In the illustrated embodiments, the architecture 300 may be implemented by a single special purpose integrated circuit (e.g., an ASIC) having a main or central processor section for overall, system-level control, and separate circuits dedicated to performing various different specific computation, functions and other processes under control of the central processor section. Those skilled in the art will appreciate that the architecture 300 can also be implemented using a plurality of separate dedicated or programmable integrated or other electronic circuits or devices (e.g., hard wired or coded electronic or logic circuits such as discrete element circuits, or programmable logic devices such as PLDs, PLAs, PAL, and the like). The architecture 300 can also be implemented using a suitable programmable general purpose computer, for example, a microprocessor, microcontroller, or other processor device (CPU), either alone or in conjunction with one or more peripheral data and signal processing devices. In general, any device or assembly of devices on which a finite state machine capable of implementing the flow charts of FIGS. 8A-8H may be used as the architecture 300, in whole or in part. Furthermore, the functions of the architecture 300 may be implemented in software, where such software may be provided in a computer-readable medium such as a magnetic dish, an optical dish, RAM, or any other computer-readable medium.

What is claimed is:

1. A supply chain order commitment method, executed on a supply chain entity computer, comprising:
   identifying services and data sources, utilizing the supply chain entity computer, capable of supporting generation of a supply chain order commitment, wherein the data sources are associated with the services, are unrelated to other data sources, are external to the supply chain entity, and are remotely located from the supply chain entity computer;
   mapping the services and data sources to enable synchronized on-demand queries, comprising:
      registering relationships between the supply chain entity the data sources and among the services and the data sources, wherein registering relationships includes:
         mapping the data sources to a pre-existing data schema;
         establishing persistent data transfer links to allow creation of real-time, concurrent order fulfillment information based on data from the data sources, wherein the persistent data transfer links enable the real-time, concurrent order fulfillment information to be automatically updated with corresponding changes to data at the data sources without persistently storing a duplicate copy of data from the data sources; and
         storing the persistent data transfer links in a repository co-located with the supply chain entity computer;
   retrieving data from the data sources using the persistent data transfer links;
   generating a graphical user interface (GUI) view of the real-time, concurrent order fulfillment information based on the retrieved data and the mapping of data sources to the pre-existing data schema;
   displaying the GUI view of the real-time, concurrent order fulfillment information on a display of the supply chain entity computer;
   if the data from the data sources changes at the data sources, automatically updating the GUI view of the real-time, concurrent order fulfillment information and displaying the updated GUI view of the real-time, concurrent order fulfillment information; and
   using the order fulfillment information to generate in real-time the supply chain order commitment.

2. The method of claim 1, wherein the fulfillment information is created from structured data and unstructured data.

3. The method of claim 2, further comprising:
   using an order commitment Xschema, mapping the structured and the unstructured data to the order commitment Xschema to create decision support results.

4. The method of claim 1 wherein the pre-existing data schema remains unchanged if the data from the data sources changes.

5. A supply chain order commitment system, comprising:
   a computer including a processor and a memory;
   a supply chain console hosted by the computer, the console, comprising:

means for relating data from multiple, unrelated data sources to a pre-existing data schema and for managing the data, wherein the multiple unrelated data sources are external to the supply chain entity and are remotely located from the supply chain console and the means for relating data comprises:

means for automatically mapping the data from the multiple unrelated data sources and supply chain services to the data schema, wherein the mapping means converts data from the data sources from a non-data schema format into a data schema format; and means for forming a query to retrieve data from the multiple unrelated data sources based on the data mapping;

means for generating views of data from the multiple unrelated data sources, wherein the viewed data is synchronized with the data on the multiple unrelated data sources, so that the viewed data is automatically updated to reflect changes to the data on the multiple data sources; and means for storing the data relationships as persistent data transfer links that cause the viewed data to be synchronized with and automatically updated to reflect changes to the data on the multiple data sources without persistently storing a duplicate copy of data from the data sources.

6. The system of claim 5, wherein the means for relating data further comprises means for receiving pre-certified data from one or more of the multiple, unrelated data sources and supply chain.

7. The system of claim 6, wherein the data schema is an Xschema, and wherein the means for mapping comprises:

an Xquery designer that maps XML-formatted data to the Xschema; and an XML designer that maps non-XML-formatted data to the Xschema.

8. The system of claim 5, wherein the views generating means comprise:

means for displaying a result of an unstructured search of the multiple, unrelated data sources;

means for displaying an unstructured order commit query of the multiple, unrelated data sources; and means for displaying a role-based structured order commit query of the multiple, unrelated data sources.

9. The system of claim 8, wherein the role-based structured order commit query is based on one or more defined roles in an order commit network, the one or more defined roles including warehouse manager, postponed manufacturing facility manager managing inbound material and on hand material, customer service clerk, master material planner validating plans executing as planned, logistics and transportation manager, chief financial officer managing inventory and risk, and procurement purchasing manager.

10. The system of claim 9, wherein the Xschema is stored locally on a user device, wherein queries are initiated from the user device, further comprising means for asynchronous distribution and replication of changes and additions to the Xschema.

11. The system of claim 5, wherein the means for storing the data relationships comprises means for caching unreliable data sources based on user preferences.

12. The system of claim 5, further comprising means for providing multiple-company, multiple project security.

13. The system of claim 5, wherein the means for displaying the decision support results comprises a web service application.

14. The system of claim 5 wherein the pre-existing data schema remains unchanged if the data from the multiple data sources changes.

15. A supply chain order commitment method, executable on a computer, comprising:

relating data from multiple, unrelated data sources to a pre-existing data schema, utilizing the computer, wherein the multiple unrelated data sources are external to and remotely located to a supply chain entity and are remotely located from the computer, wherein the relating data includes:

automatically mapping the data from the multiple unrelated data sources and supply chain services to the data schema, wherein the mapping includes converting data from the data sources from a non-data schema format into a data schema format;

forming a query to retrieve data from the multiple unrelated data sources based on the data mapping;

generating views of data from the multiple unrelated data sources, wherein the viewed data is synchronized with the data on the multiple unrelated data sources, so that the viewed data is automatically updated to reflect changes to the data on the multiple data sources;

storing the data relationships as persistent data transfer links that cause the viewed data to be synchronized with and automatically updated to reflect changes to the data on the multiple data sources without persistently storing a duplicate copy of the data from the data sources;

displaying the generated data views.

16. The method of claim 15, wherein relating data comprises receiving pie-certified data from one or more of the multiple, unrelated data sources and supply chain.

17. The method of claim 16, wherein the data schema is an Xschema, and wherein the mapping comprises:

using an Xquery designer to map XML-formatted data to the Xschema; and using an XML designer to map non-XML-formatted data to the Xschema.

18. The method of claim 15, wherein generating views of data comprises:

displaying a result of an unstructured search of the multiple, unrelated data sources;

displaying an unstructured order commit query of the multiple, unrelated data sources; and displaying a role-based structured order commit query of the multiple, unrelated data sources.

19. The method of claim 17, further comprising:

storing the Xschema locally on a user device;

initiating Xqueries from the user device; and asynchronously distributing and replicating changes and additions to the Xschema.

20. The method of claim 15, wherein storing the data relationships comprises caching unreliable data sources based on user preferences.

21. The method of claim 15, further comprising providing multiple-company, multiple project security.

22. The method of claim 15, wherein displaying the generated data views comprises displaying the results using a web service application.

23. The method of claim 15 wherein the pre-existing data schema remains unchanged if the data from the multiple data sources changes.

\* \* \* \* \*